(12) United States Patent
Katz

(10) Patent No.: US 11,374,621 B2
(45) Date of Patent: *Jun. 28, 2022

(54) SYSTEMS AND METHODS FOR PULSE WIDTH ENCODED DATA COMMUNICATIONS

(71) Applicant: NuCurrent, Inc., Chicago, IL (US)

(72) Inventor: Michael H. Katz, Glen Ellyn, IL (US)

(73) Assignee: NuCurrent, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/145,699

(22) Filed: Jan. 11, 2021

(65) Prior Publication Data
US 2021/0211159 A1    Jul. 8, 2021

Related U.S. Application Data

(63) Continuation of application No. 16/735,342, filed on Jan. 6, 2020, now Pat. No. 10,892,800.

(51) Int. Cl.
*H04B 1/38* (2015.01)
*H04L 27/00* (2006.01)
(Continued)

(52) U.S. Cl.
CPC ............ *H04B 5/0037* (2013.01); *H02J 50/12* (2016.02); *H02J 50/20* (2016.02); *H02J 50/80* (2016.02)

(58) Field of Classification Search
None
See application file for complete search history.

(56) References Cited

U.S. PATENT DOCUMENTS

| 2,144,221 A | 1/1939 | Lee et al. |
| 4,450,586 A | 5/1984 | Fujino |
(Continued)

FOREIGN PATENT DOCUMENTS

| CN | 102483440 A | 5/2012 |
| KR | 20130027947 A | 3/2013 |
(Continued)

OTHER PUBLICATIONS

PCT/US2021/012226 International Search Report and Written Opinion dated Apr. 20, 2021, 12 pages.
(Continued)

*Primary Examiner* — Tuan A Tran
(74) *Attorney, Agent, or Firm* — Lee Sullivan Shea & Smith LLP

(57) ABSTRACT

A system for wireless communications includes an antenna and a controller, the antenna configured to transmit electrical data signals, the electrical data signals including an encoded message signal. The encoded message signal including one or more encoded message words. The controller is configured to encode one or more message words, of a message signal, into one or more encoded message words of the encoded message signal, based on a coding format. The coding format correlates each of a plurality of correlated ratios with one of a plurality of format words. Each of the plurality of correlated ratios is a ratio of a duty cycle of a pulse to a respective period associated with one or both of the duty cycle and the pulse. Each of the one or more encoded message words are encoded as one of the plurality of correlated ratios.

14 Claims, 19 Drawing Sheets

(51) Int. Cl.
*H03K 7/08* (2006.01)
*H01F 27/42* (2006.01)
*G05B 11/01* (2006.01)
*H04B 5/00* (2006.01)
*H02J 50/12* (2016.01)
*H02J 50/80* (2016.01)
*H02J 50/20* (2016.01)

(56) References Cited

U.S. PATENT DOCUMENTS

| | | | |
|---|---|---|---|
| 5,119,104 A | 6/1992 | Heller | |
| 6,173,018 B1 | 1/2001 | Kuroki | |
| 6,255,901 B1 | 7/2001 | Steinhagen et al. | |
| 6,822,588 B1 * | 11/2004 | Marshall, Jr | H03M 7/165 |
| | | | 341/111 |
| 7,999,417 B2 | 8/2011 | Kato et al. | |
| 8,068,013 B2 * | 11/2011 | Otsuka | G08C 19/28 |
| | | | 340/12.22 |
| 8,134,453 B2 * | 3/2012 | Ootsuka | H04B 1/202 |
| | | | 340/12.22 |
| 8,417,359 B2 * | 4/2013 | Tsai | H02J 50/12 |
| | | | 700/22 |
| 8,472,507 B2 * | 6/2013 | Sharma | H04W 52/0235 |
| | | | 375/220 |
| 9,154,175 B2 * | 10/2015 | Kashima | B60R 16/03 |
| 9,215,023 B2 * | 12/2015 | Rofougaran | H04L 7/0008 |
| 9,270,139 B2 * | 2/2016 | Rofougaran | H02J 50/10 |
| 9,780,922 B2 * | 10/2017 | Calderbank | H04B 7/0669 |
| 9,831,684 B2 * | 11/2017 | Lisi | H02J 50/40 |
| 10,252,072 B2 * | 4/2019 | Law | A61N 1/025 |
| 10,256,676 B2 * | 4/2019 | Gray | H02J 50/80 |
| 2002/0016177 A1 | 2/2002 | Miya et al. | |
| 2006/0139015 A1 | 6/2006 | Dinh | |
| 2007/0076820 A1 | 4/2007 | Kao et al. | |
| 2007/0129096 A1 | 6/2007 | Okumura et al. | |
| 2008/0252367 A1 | 10/2008 | Pettersen et al. | |
| 2009/0284369 A1 | 11/2009 | Toncich et al. | |
| 2009/0302935 A1 | 12/2009 | Iwata et al. | |
| 2010/0189196 A1 | 7/2010 | Wang et al. | |
| 2011/0105142 A1 | 5/2011 | Sawai | |
| 2011/0291489 A1 * | 12/2011 | Tsai | H02J 50/12 |
| | | | 307/104 |
| 2012/0025631 A1 | 2/2012 | Shionoiri et al. | |
| 2012/0063505 A1 * | 3/2012 | Okamura | H02J 7/025 |
| | | | 375/238 |
| 2012/0161696 A1 | 6/2012 | Cook et al. | |
| 2012/0212074 A1 | 8/2012 | Uchida | |
| 2012/0213314 A1 | 8/2012 | Subburaj et al. | |
| 2012/0287985 A1 | 11/2012 | Okamura et al. | |
| 2013/0236191 A1 * | 9/2013 | Uo | H04B 10/40 |
| | | | 398/135 |
| 2014/0159646 A1 | 6/2014 | Sankar et al. | |
| 2014/0192931 A1 | 7/2014 | Vandebeek et al. | |
| 2014/0339923 A1 | 11/2014 | Simopoulos et al. | |
| 2015/0097442 A1 | 4/2015 | Muurinen | |
| 2015/0229135 A1 | 8/2015 | Porat et al. | |
| 2015/0233987 A1 | 8/2015 | Von Novak, III et al. | |
| 2016/0176300 A1 | 6/2016 | Bucher et al. | |
| 2016/0197486 A1 | 7/2016 | Von Novak, III et al. | |
| 2016/0373014 A1 * | 12/2016 | Pflaum | H02M 3/33523 |
| 2017/0093225 A1 | 3/2017 | Murayama et al. | |
| 2017/0141621 A1 | 5/2017 | Zeine et al. | |
| 2017/0201123 A1 | 7/2017 | Park | |
| 2018/0256030 A1 | 9/2018 | Lee et al. | |
| 2018/0337528 A1 | 11/2018 | Taya | |
| 2019/0006889 A1 | 1/2019 | Iwasaki | |
| 2019/0074726 A1 | 3/2019 | Hosotani | |
| 2019/0348912 A1 * | 11/2019 | Philip | H02M 1/08 |
| 2019/0386513 A1 | 12/2019 | Bavisi et al. | |
| 2020/0059119 A1 | 2/2020 | Maniktala | |
| 2020/0227935 A1 | 7/2020 | Mehta et al. | |
| 2021/0028657 A1 | 1/2021 | Goodchild et al. | |
| 2021/0152037 A1 | 5/2021 | Goodchild | |

FOREIGN PATENT DOCUMENTS

| | | |
|---|---|---|
| KR | 20160059395 A | 5/2016 |
| KR | 101815323 B1 | 1/2018 |
| KR | 20180101618 A | 9/2018 |
| WO | 2018004120 A1 | 1/2018 |

OTHER PUBLICATIONS

International Searching Authority, PCT International Search Report and Written Opinion, PCT International Application No. PCT/US2021/042763 dated Nov. 4, 2021, 10 pages.

Differentiator and Integrated Circuits: Operational Amplifiers, Electronics Textbook, "Chapter 8—Operational Amplifiers" [online], [retrieved Jan. 15, 2022], Retrieved from the internet:https://web.archive.org/web/20161018101144/https://www.allaboutcircuits.com/textbook/semiconductors/chpt-8/differentiator-integrator-circuits/, 6 pages.

International Searching Authority, PCT International Search Report and Written Opinion, PCT International Application No. PCT/US2022/014602 dated May 16, 2022, 9 pages.

* cited by examiner

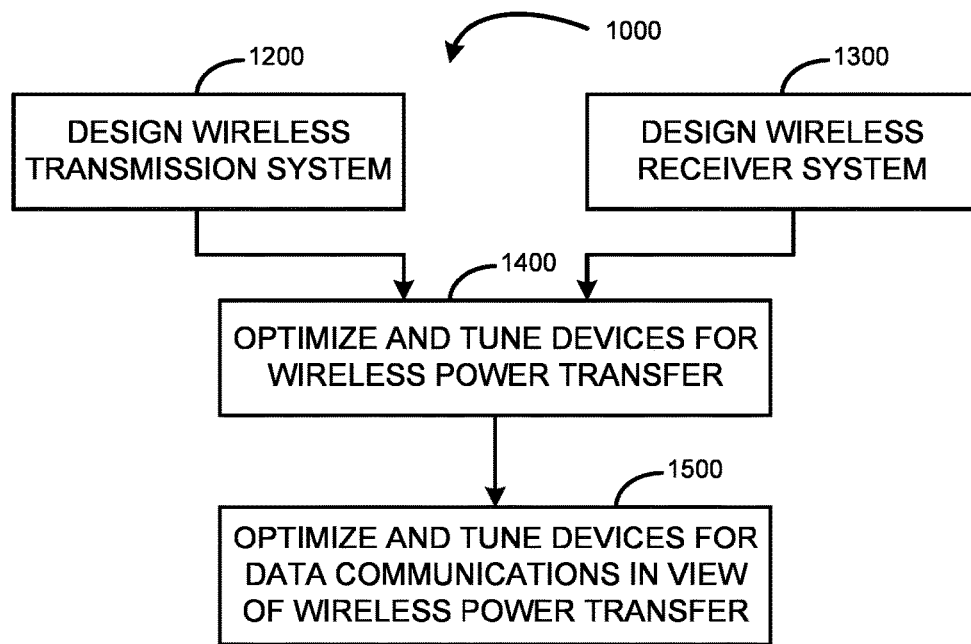
FIG. 19
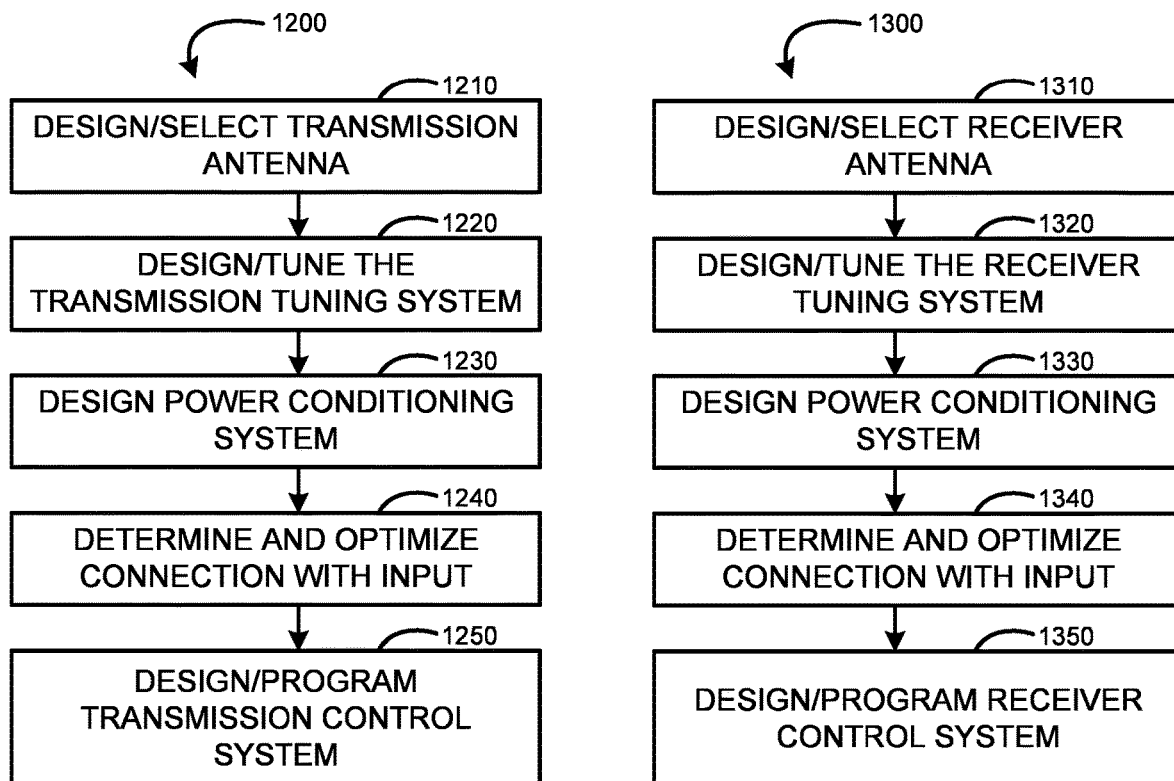
FIG. 20  FIG. 21

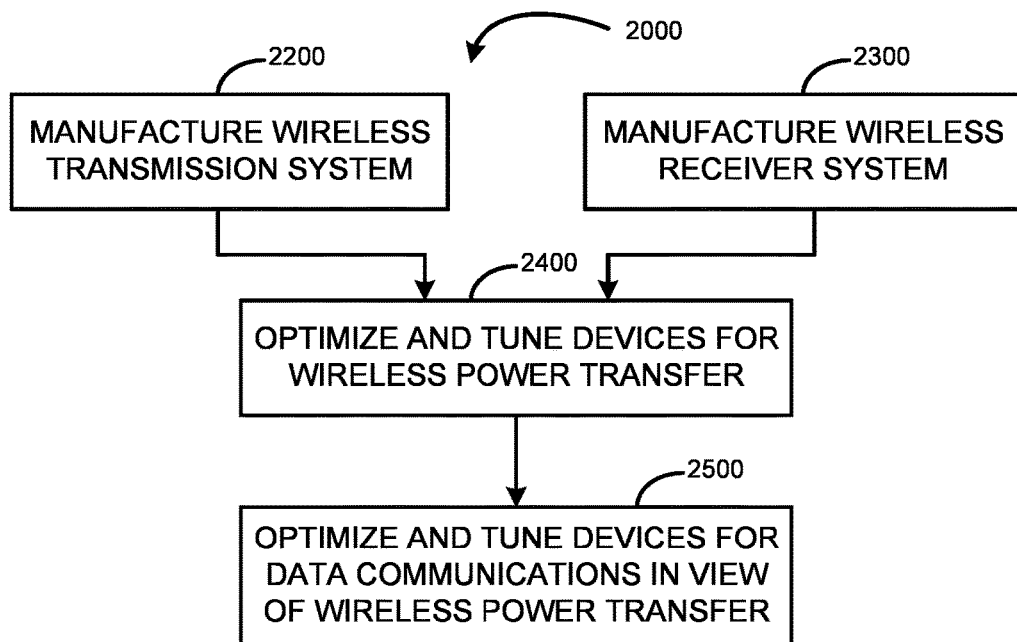
FIG. 22
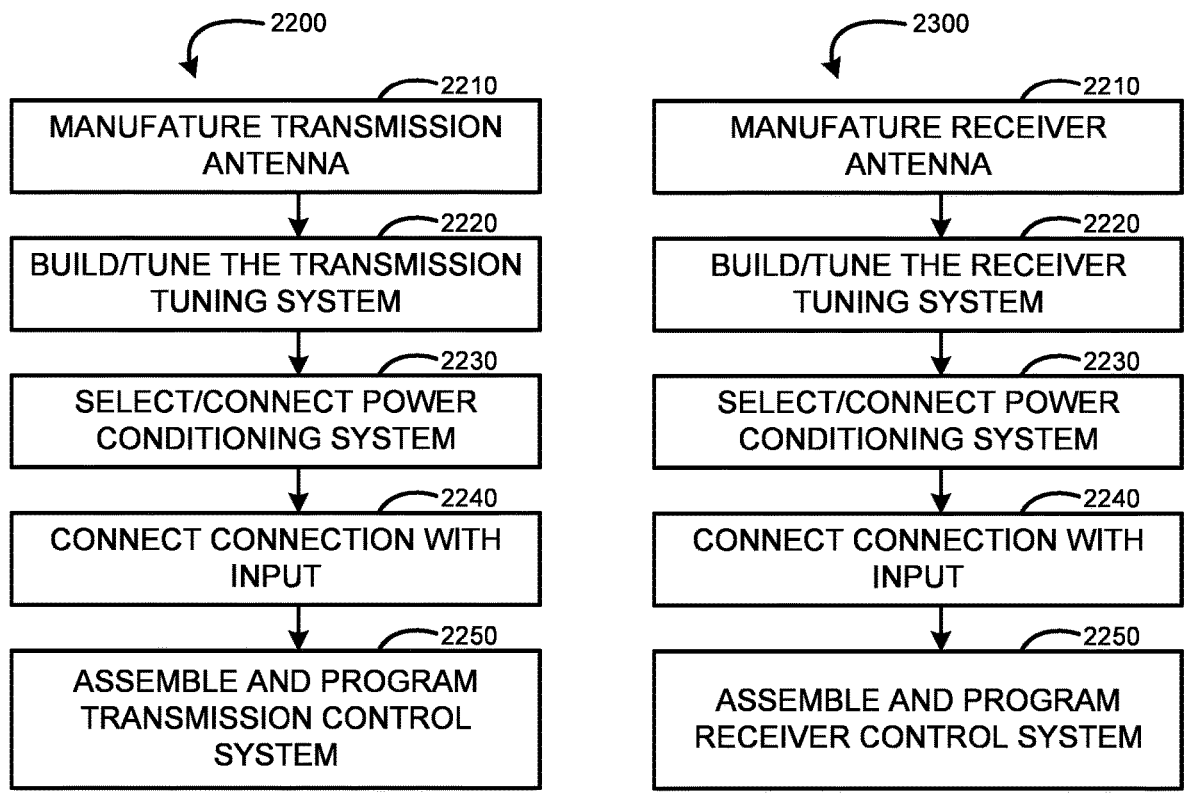
FIG. 23      FIG. 24

SYSTEMS AND METHODS FOR PULSE WIDTH ENCODED DATA COMMUNICATIONS

CROSS-REFERENCE TO RELATED APPLICATIONS

This application is a continuation of, and claims priority to, U.S. Non-Provisional application Ser. No. 16/735,342, filed Jan. 6, 2020, and entitled "SYSTEMS AND METHODS FOR WIRELESS POWER TRANSFER INCLUDING PULSE WIDTH ENCODED DATA COMMUNICATIONS," the contents of which are incorporated herein by reference in its entirety.

TECHNICAL FIELD

The present disclosure generally relates to systems and methods for wireless transfer of electrical power and/or electrical data signals, and, more particularly, to data communications associated with wireless power transfer, utilizing pulse width encoded data communications.

BACKGROUND

Wireless connection systems are used in a variety of applications for the wireless transfer of electrical energy, electrical power, electromagnetic energy, electrical data signals, among other known wirelessly transmittable signals. Such systems often use inductive wireless power transfer, which occurs when magnetic fields created by a transmitting element induce an electric field, and hence, an electric current, in a receiving element. These transmission and receiver elements will often take the form of coiled wires and/or antennas.

Transmission of one or more of electrical energy, electrical power, electromagnetic energy and electronic data signals from one of such coiled antennas to another, generally, operates at an operating frequency and/or an operating frequency range. The operating frequency may be selected for a variety of reasons, such as, but not limited to, power transfer characteristics, power level characteristics, self-resonant frequency restraints, design requirements, adherence to standards bodies' required characteristics, bill of materials (BOM) and/or form factor constraints, among other things. It is to be noted that, "self-resonating frequency," as known to those having skill in the art, generally refers to the resonant frequency of an inductor due to the parasitic characteristics of the component.

When such systems operate to wirelessly transfer power from a transmission system to a receiver system, via the coiled antennas, it is often desired to simultaneously or intermittently communicate electronic data from one system to the other, and, in some examples, vice versa. To that end, a variety of communications systems, methods, and/or apparatus have been utilized. In some example systems, wireless power transfer related communications (e.g., validation procedures, electronic characteristics data communications, voltage data, current data, device type data, among other contemplated data communications) are performed using other circuitry, such as an optional Near Field Communications (NFC) antenna utilized to compliment the wireless power system and/or additional Bluetooth chipsets for data communications, among other known communications circuits and/or antennas. To that end, the current Rezence standard for wireless power transfer, operating at an operating frequency of 6.78 MHz, requires utilization of an additional Bluetooth circuit to allow for communications between the wireless receiver system and its associated wireless transmission system, during wireless power transfer applications.

Accordingly, wireless power transmission systems are desired that have communications capabilities using the same or similar circuitry and/or components as the functional components used for wireless power transfer in the wireless power transfer system. To that end, some wireless power transfer systems utilize communications within the band of the frequency of wireless power transmission, for what is commonly known in telecommunications as "in-band communications." Accordingly, the current Qi standard for wireless power transfer utilizes unidirectional communication wherein the receiver system communicates to the transmitter and requests more or less power; such communications are performed in band of the wireless power transmission by utilizing "backscatter modulation." For backscatter modulation, the antenna coil at the receiver system is intelligently loaded, which changes the field strength at the transmitter. Such current draws are monitored and demodulated into the information required to enable communications from the receiver system to the transmitter system.

SUMMARY

New systems and methods for in band communications in wireless power transfer systems, utilizing new encoding methods that do not require additional circuits, are desired.

In accordance with one aspect of the disclosure, a wireless receiver system for a wireless power transfer system is disclosed. The wireless receiver system is configured to wirelessly receive electrical power from a wireless transmission system. The ireless receiver system includes an antenna, the antenna configured to receive electrical energy signals from the wireless transmission system and transmit electrical data signals to the wireless transmission system, the electrical data signals including an encoded message signal. The encoded message signal including one or more encoded message words. The wireless receiver system further includes a controller, which includes a processor. The controller is configured to determine a message signal, the message signal including one or more message words, and encode the one or more message words into one or more encoded message words of the encoded message signal, based on a coding format. The coding format correlates each of a plurality of correlated rations, respectively, with one of a plurality of format words, each of the plurality of correlated ratios corresponding to one of a plurality of format words. Each of the plurality of correlated ratios is a ratio of a duty cycle of a pulse to a respective period associated with one or both of the duty cycle and the pulse. Each of the one or more encoded message words are encoded as one of the plurality of correlated ratios. The controller is further configured to determine the encoded message signal based on the plurality of encoded message words and communicate the encoded message signal to the transmission antenna.

In a refinement, the plurality of format words includes a start word, the plurality of correlated ratios includes a start correlated ratio, and the start ratio corresponds with the start word. In such a refinement, the encoded message signal includes an encoded start word the encoded start word indicating a beginning of the encoded message signal and the encoded start word is encoded as the start correlated ratio.

In another refinement, the period is an undefined, asynchronous period.

In another refinement, the message signal is based, at least in part, on an input data source associated with one or both of the wireless receiver system, the controller, and any combinations thereof.

In another refinement, the input data source includes electrical characteristic information associated with the wireless receiver system.

In further refinement, the system further includes a rectifier circuit, the rectifier circuit configured to receive electrical energy signals from the antenna and condition the electrical energy signals for output to a load. In such a refinement, the electrical characteristic information includes an output voltage of the rectifier.

In another refinement, the wireless transmission system includes, at least, a transmission antenna configured to couple with the antenna for wireless transfer of the electrical energy signals, the transmission antenna and antenna coupled via an electromagnetic field. In such a refinement, the controller is further configured to modulate the electromagnetic field based on the encoded message signal to transmit the encoded message signal.

In accordance with another aspect of the disclosure, a wireless power transfer system is disclosed. The wireless power transfer system includes a wireless transmission system, the wireless transmission system including a transmission antenna, which is configured to wirelessly transmit electrical energy signals and receive an encoded message signal. The wireless transmission system further includes a transmission controller, including a processor. The wireless power transfer system further includes a wireless receiver system including a receiver antenna and a receiver controller. The receiver antenna is configured to receive electrical energy signals from the transition antenna and transmit the encoded message signal, the encoded message signal comprising one or more encoded message words. The receiver controller includes a processor and is configured to determine a message signal, the message signal including one or more message words, and encode the one or more message words into one or more encoded message words of the encoded message signal based on a coding format. The coding format correlates each of a plurality of correlated ratios, respectively, with one of a plurality of format words, each of the plurality of correlated ratios corresponding to one of a plurality of format words. Each of the plurality of correlated ratios is a ratio of a duty cycle of a pulse to a respective period associated with one or both of the duty cycle and the pulse. Each of the one or more encoded message words are encoded as one of the plurality of correlated ratios. The receiver controller is further configured to determine the encoded message signal based on the plurality of encoded message words and communicate the encoded message signal to the transmission antenna. The transmission controller is configured to receive the encoded message signal, including the one or more encoded message words, decode the one or more encoded message words into one or more decoded message words, based on the coding format, by referencing each of the plurality of decoded message words against the plurality of correlated ratios, and determining the message signal based on the one or more decoded message words.

In a refinement, the plurality of format words includes a start word, the plurality of correlated ratios includes a start correlated ratio, and the start ratio corresponds with the start word. In such a refinement, the encoded message signal includes an encoded start word the encoded start word indicating a beginning of the encoded message signal and the encoded start word is encoded as the start correlated ratio.

In another refinement, decoding the one or more encoded message word, by the transmission controller, further includes, determining the beginning of the decoded message words based on decoding of the encoded start word.

In another refinement, the period is an undefined, asynchronous period.

In another refinement, the message signal is based, at least in part, on an input data source associated with one or both of the wireless receiver system, the controller, and any combinations thereof.

In another refinement, the wireless receiver system further includes a rectifier circuit, the rectifier circuit configured to receive electrical energy signals from the antenna and condition the electrical energy signals for output to a load and the electrical characteristic information includes an output voltage at the output of the rectifier.

In another refinement, the transmission antenna is configured to couple with the receiver antenna for wireless transfer of the electrical energy signals, the transmission antenna and receiver antenna coupled via an electromagnetic field and the controller is further configured to modulate the electromagnetic field based on the encoded message signal to transmit the encoded message signal.

In accordance with yet another aspect of the disclosure, a method for operating a wireless power transfer system is disclosed. The wireless power transfer system includes a wireless transmission system and a wireless receiver system. The method includes electromagnetically coupling the wireless transmission system with the wireless receiver system, via electromagnetic coupling of a transmission antenna of the wireless transmission system and a receiver antenna of the wireless receiver antenna. The method further includes determining a message signal, by the wireless receiver system, the message signal including one or more message words. The method further includes encoding, by the wireless receiver system, the one or more message words into one or more encoded message words of the encoded message signal, based on a coding format. The coding format correlates a plurality of correlated ratios, respectively, with one of a plurality of format words. Each of the plurality of correlated ratios corresponds to one of a plurality of format word. Each of the plurality of correlated ratios is a ratio of a duty cycle of a pulse to a respective period associated with one or both of the duty cycle and the pulse. Each of the one or more encoded message words are encoded as one of the plurality of correlated ratios. The method further includes transmitting the encoded message signal, by the wireless receiver system, via the electromagnetic coupling of the transmission antenna and the receiver antenna.

In a refinement, the method further includes receiving, by the wireless transmission system, the encoded message signal, including the one or more encoded message words. The method further includes decoding, by the wireless transmission system, the one or more encoded message words into one or more decoded message words, based on the coding format, by referencing each of the plurality of decoded message words against the plurality of correlated ratios. The method further includes determining the message signal based on the one or more decoded message words.

In a further refinement, the method further includes transmitting electrical energy signals, from the wireless transmission system to the wireless receiver system, based, at least in part, on the message signal.

In another further refinement, the message signal includes, at least, electrical characteristic information associated with the wireless receiver system and a magnitude of the electrical energy signals is based, at least in part, on the electrical characteristic information.

In a further refinement, the electrical characteristic information includes, at least, an output voltage at the output of a rectifier circuit of the wireless receiver system, and, the magnitude of the electrical energy signals is based, at least in part, on the output voltage at the output of the rectifier circuit.

In a refinement, the plurality of format words includes a start word, the plurality of correlated ratios includes a start correlated ratio, and the start ratio corresponds with the start word. In such a refinement, the encoded message signal includes an encoded start word the encoded start word indicating a beginning of the encoded message signal and the encoded start word is encoded as the start correlated ratio.

The systems, methods, and/or apparatus disclosed herein may be particularly beneficial in any wireless or wired communications system, wherein pulse width encoding is optimal for achieving greater data rates, reducing bill of materials, providing asynchronous data communications, providing data communications absent a clock, and/or providing data communications with a medium susceptible to unreliable and/or inconsistent data rates.

In addition, the systems, methods, and/or apparatus may be beneficial by enabling a near limitless amount of message word formats for encoding and/or decoding a message. Such formats may include, but are not limited to including higher bit binary formats (e.g., 4-bit binary, 8-bit binary, 16-bit binary, . . . , up to 2n-bit binary, for any integer "n"), base-8 or hexadecimal messages (including single or multiple digits), base-10 or decimal messages (including single or multiple digits), alphanumeric messages (including single or multiple alphanumeric characters), ASCII messages (including single or multiple ASCII characters), among other forms of transferable data messages.

The systems, methods, and/or apparatus disclosed herein may be beneficial in any data communications systems, such as those associated with wireless power transfer, that requires an asynchronous or un-clocked data signal communication. Pulse width encoded signals may be "un-clocked" and/or asynchronous communicative signals. An "un-clocked" communication signal, as defined herein, refers to a signal that does not require an oscillating clock signal to synchronize a sender of a message with the receiver of said message. Such un-clocked signals are advantageous, as the receiver and sender need not be synchronized, but just need to know a common coding format.

By utilizing the systems, methods, and/or apparatus disclosed herein, the only limit to the size of the data in the coding format is the granularity and/or performance capabilities of the hardware and/or software utilized to implement an encoder and decoder. Therefore, data rates using such pulse width encoding of the system may enable faster data communications using less expensive, legacy hardware, when compared to utilizing legacy coding methods.

Additionally or alternatively, utilizing the pulse width encoding of the systems, methods, and apparatus disclosed herein may be utilized for data compression, by utilizing coding formats wherein more information is contained within each pulse. Such encoding, when compared to legacy coding methods that are limited by the speed of transmission of binary bits, the number of bits, or other information, held within a pulse is merely limited by the granularity and/or performance of hardware and/or software used to realize the encoder and/or decoder.

The systems, methods, and apparatus disclosed herein are further useful in situations where it is desired that encoding is independent of data rate and/or the pulse period. "Independent of data rate" refers to signal communication conditions wherein a sender of a message and a receiver of said message do not have to operate at a common and/or consistent rate of transfer of data between sender and receiver.

These and other aspects and features of the present disclosure will be better understood when read in conjunction with the accompanying drawings.

BRIEF DESCRIPTION OF THE DRAWINGS

FIG. 19 is a flow chart for an exemplary method for designing a system for wireless transmission of one or more of electrical energy, electrical power, electromagnetic energy, electronic data, and combinations thereof, in accordance with FIGS. 1-19 and the present disclosure.

FIG. 20 is a flow chart for an exemplary method for designing a wireless transmission system for the system of FIG. 19, in accordance with FIGS. 1-19, and the present disclosure.

FIG. 21 is a flow chart for an exemplary method for designing a wireless receiver system for the system of FIG. 19, in accordance with FIGS. 1-18 and the present disclosure.

FIG. 22 is a flow chart for an exemplary method for manufacturing a system for wireless transmission of one or more of electrical energy, electrical power, electrical electromagnetic energy, electronic data, and combinations thereof, in accordance with FIGS. 1-18 and the present disclosure.

FIG. 23 is a flow chart for an exemplary method for designing a wireless transmission system for the system of FIG. 22, in accordance with FIGS. 1-18, FIG. 22, and the present disclosure.

FIG. 24 is a flow chart for an exemplary method for designing a wireless receiver system for the system of FIG. 22, in accordance with FIGS. 1-18, FIG. 22, and the present disclosure.

While the following detailed description will be given with respect to certain illustrative embodiments, it should be understood that the drawings are not necessarily to scale and the disclosed embodiments are sometimes illustrated diagrammatically and in partial views. In addition, in certain instances, details which are not necessary for an understanding of the disclosed subject matter or which render other details too difficult to perceive may have been omitted. It should therefore be understood that this disclosure is not limited to the particular embodiments disclosed and illustrated herein, but rather to a fair reading of the entire disclosure and claims, as well as any equivalents thereto. Additional, different, or fewer components and methods may be included in the systems and methods.

DETAILED DESCRIPTION

In the following description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Figure 1:
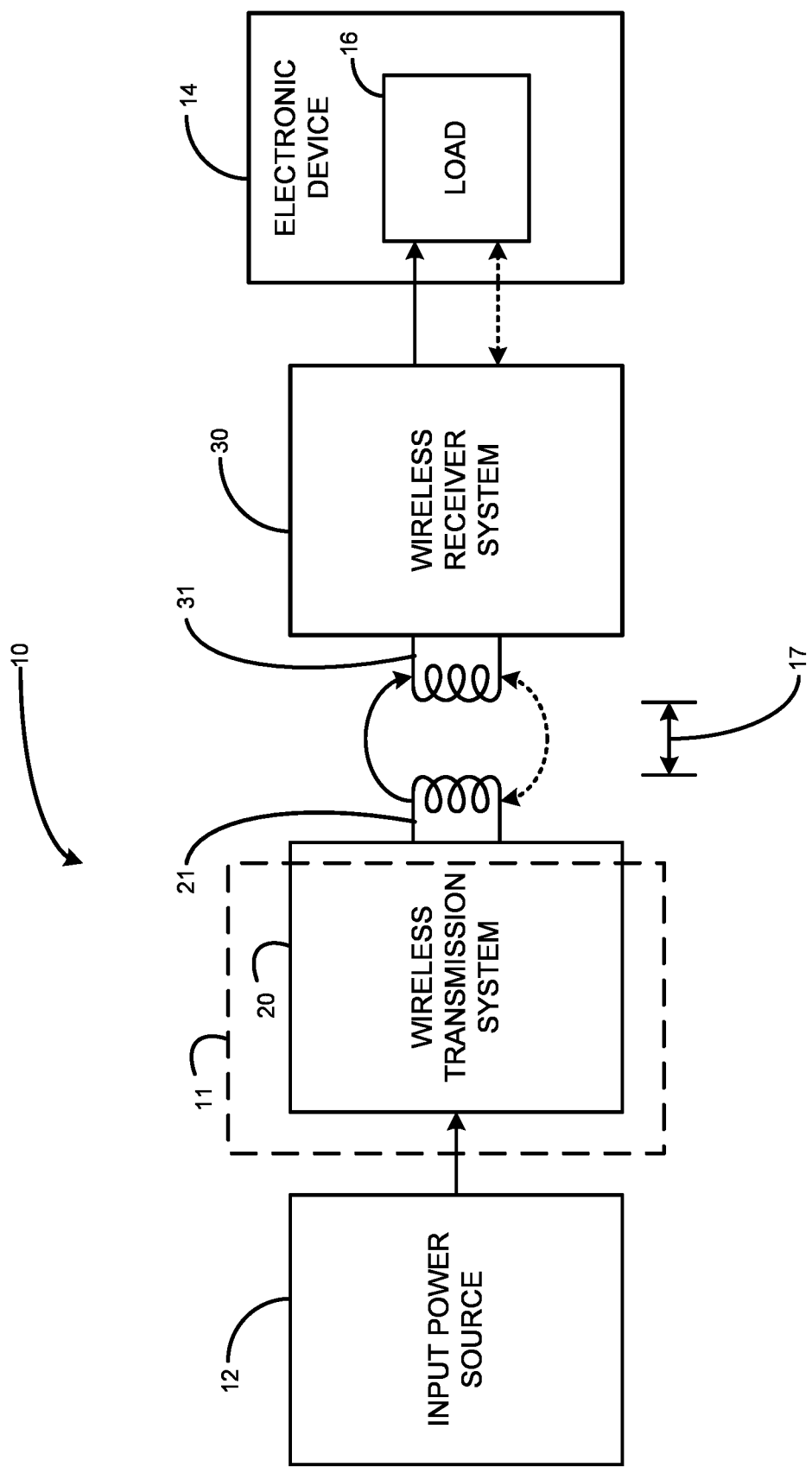
FIG. 1 is a block diagram of an embodiment of a system for wirelessly transferring one or more of electrical energy, electrical power, electromagnetic energy electronic data, and combinations thereof, in accordance with the present disclosure.

Referring now to the drawings and with specific reference to FIG. 1, a wireless electrical connection system 10 is illustrated. The wireless electrical connection system 10 provides for the wireless transmission of electrical signals, such as, but not limited to, electrical energy, electrical power, electromagnetic energy, and electronically transmittable data ("electronic data"). Specifically, the wireless electrical connection system 10 provides for the wireless transmission of electrical signals via near field magnetic coupling. As shown in the embodiment of FIG. 1, the wireless electrical connection system 10 includes a wireless transmission system 20 and a wireless receiver system 30. The wireless receiver system is configured to receive electrical energy, electrical power, electromagnetic energy, and/or electronic data from, at least, the wireless transmission system 20.

As illustrated, the wireless transmission system 20 and wireless receiver system 30 may be configured to transmit electrical energy, electrical power, electromagnetic energy, and/or electronically transmittable data across, at least, a separation distance or gap 17. A separation distance or gap, such as the gap 17, in the context of a wireless connection system, such as the system 10, does not include a physical connection, such as a wired connection. There may be intermediary objects located in a separation distance or gap, such as the gap 17, such as, but not limited to, air, a counter top, a casing for an electronic device, a plastic filament, an insulator, a mechanical wall, among other things; however, there is no physical, electrical connection at such a separation distance or gap.

Thus, the combination of the wireless transmission system 20 and the wireless receiver system 30 create an electrical connection without the need for a physical connection. "Electrical connection," as defined herein, refers to any facilitation of a transfer of an electrical current, voltage, and/or power from a first location, device, component, and/or source to a second location, device, component, and/or destination. An "electrical connection" may be a physical connection, such as, but not limited to, a wire, a trace, a via, among other physical electrical connections, connecting a first location, device, component, and/or source to a second location, device, component, and/or destination. Additionally or alternatively, an "electrical connection" may be a wireless electrical connection, such as, but not limited to, magnetic, electromagnetic, resonant, and/or inductive field, among other wireless electrical connections, connecting a first location, device, component, and/or source to a second location, device, component, and/or destination.

Alternatively, the gap 17 may be referenced as a "Z-Distance," because, if one considers an antenna 21, 31 to be disposed substantially along a common X-Y plane, then the distance separating the antennas 21, 31 is the gap in a "Z" or "depth" direction. However, flexible and/or non-planar coils are certainly contemplated by embodiments of the present disclosure and, thus, it is contemplated that the gap 17 may not be uniform, across an envelope of connection distances between the antennas 21, 31. It is contemplated that various tunings, configurations, and/or other parameters may alter the possible maximum distance of the gap 17, such that electrical transmission from the wireless transmission system 20 to the wireless receiver system 30 remains possible.

The wireless power system 10 operates when the wireless transmission system 20 and the wireless receiver system 30 are coupled. As defined herein, the terms "couples," "coupled," and "coupling" generally refers to magnetic field coupling, which occurs when the energy of a transmitter and/or any components thereof and the energy of a receiver and/or any components thereof are coupled to each other through a magnetic field. Coupling of the wireless transmission system 20 and the wireless receiver system 30, in the system 10, may be represented by a resonant coupling coefficient of the system 10 and, for the purposes of wireless power transfer, the coupling coefficient for the system 10 may be in the range of about 0.01 and 0.9.

As illustrated, the wireless transmission system 20 may be associated with a host device 11, which may receive power from an input power source 12. The host device 11 may be any electrically operated device, circuit board, electronic assembly, dedicated charging device, or any other contemplated electronic device. Example host devices 11, with which the wireless transmission system 20 may be associated therewith, include, but are not limited to including, a device that includes an integrated circuit, cases for wearable electronic devices, receptacles for electronic devices, a portable computing device, clothing configured with electronics, storage medium for electronic devices, charging apparatus for one or multiple electronic devices, dedicated electrical charging devices, activity or sport related equipment, goods, and/or data collection devices, among other contemplated electronic devices.

As illustrated, one or both of the wireless transmission system 20 and the host device 11 are operatively associated with an input power source 12. The input power source 12 may be or may include one or more electrical storage devices, such as an electrochemical cell, a battery pack, and/or a capacitor, among other storage devices. Additionally or alternatively, the input power source 12 may be any electrical input source (e.g., any alternating current (AC) or direct current (DC) delivery port) and may include connection apparatus from said electrical input source to the wireless transmission system 20 (e.g., transformers, regulators, conductive conduits, traces, wires, or equipment, goods, computer, camera, mobile phone, and/or other electrical device connection ports and/or adaptors, such as but not limited to USB or mp3 ports and/or adaptors, among other contemplated electrical components).

Electrical energy received by the wireless transmission system 20 is then used for at least two purposes: providing electrical power to internal components of the wireless transmission system 20 and providing electrical power to the transmitter antenna 21. The transmitter antenna 21 is configured to wirelessly transmit the electrical signals conditioned and modified for wireless transmission by the wireless transmission system 20 via near-field magnetic coupling (NFMC). Near-field magnetic coupling enables the transfer of electrical energy, electrical power, electromagnetic energy, and/or electronically transmissible data wirelessly through magnetic induction between the transmitter antenna 21 and a receiving antenna 31 of, or associated with, the wireless receiver system 30. Near-field magnetic coupling may enable "inductive coupling," which, as defined herein, is a wireless power transmission technique that utilizes an alternating electromagnetic field to transfer electrical energy between two antennas. Such inductive coupling is the near field wireless transmission of electrical energy between two magnetically coupled coils that are tuned to resonate at a similar frequency. Further, such near-field magnetic coupling may provide connection via "mutual inductance," which, as defined herein is the production of an electromotive force in a circuit by a change in current in a second circuit magnetically coupled to the first.

In one or more embodiments, the inductor coils of either the transmitter antenna 21 or the receiver antenna 31 are strategically positioned to facilitate reception and/or transmission of wirelessly transferred electrical energy, power, electromagnetic energy and/or data through near field magnetic induction. Antenna operating frequencies may comprise all operating frequency ranges, examples of which may include, but are not limited to, about 110 kHz to about 205 kHz (Qi interface standard), 100 kHz to about 350 kHz (PMA interface standard), 6.78 MHz (Rezence interface standard and/or any other proprietary interface standard operating at a frequency of 6.78 MHz), 13.56 MHz (Near Field Communications (NFC) standard, defined by ISO/IEC standard 18092), 27 MHz and/or, alternatively, at an operating frequency of another proprietary operating mode. The operating frequencies of the antennas 21, 31 may be operating frequencies designated by the International Telecommunications Union (ITU) in the Industrial, Scientific, and Medical (ISM) frequency bands, which include, but is not limited to including, 6.78 MHz, 13.56 MHz, and 27 MHz, which are designated for use in wireless power transfer.

In addition, the transmitting antenna and/or the receiving antenna of the present disclosure may be designed to transmit or receive, respectively, over a wide range of operating frequencies on the order of about 1 kHz to about 1 GHz or greater, in addition to the Qi, PMA, Rezence, and NFC interface standards. The transmitting antenna and the receiving antenna of the present disclosure may be configured to transmit and/or receive electrical power having a magnitude that ranges from about 10 mW to about 500 W. In one or more embodiments the inductor coil of the transmitting antenna 21 is configured to resonate at a transmitting antenna resonant frequency or within a transmitting antenna resonant frequency band.

As known to those skilled in the art, a "resonant frequency" or "resonant frequency band" refers a frequency or frequencies wherein amplitude response of the antenna is at a relative maximum, or, additionally or alternatively, the frequency or frequency band where the capacitive reactance has a magnitude substantially similar to the magnitude of the inductive reactance. In one or more embodiments the transmitting antenna resonant frequency is at least 1 kHz. In one or more embodiments the transmitting antenna resonant frequency band extends from about 1 kHz to about 100 MHz. In one or more embodiments the inductor coil of the receiving antenna 31 is configured to resonate at a receiving antenna resonant frequency or within a receiving antenna resonant frequency band. In one or more embodiments the receiving antenna resonant frequency is at least 1 kHz. In one or more embodiments the receiving antenna resonant frequency band extends from about 1 kHz to about 100 MHz.

The wireless receiver system 30 may be associated with at least one electronic device 14, wherein the electronic device 14 may be any device that requires electrical power for any function and/or for power storage (e.g., via a battery and/or capacitor). Additionally or alternatively, the electronic device 14 may be any device capable of receipt of electronically transmissible data. For example, the device may be, but is not limited to being, a handheld computing device, a mobile device, a portable appliance, an integrated circuit, an identifiable tag, a kitchen utility device, an electronic tool, an electric vehicle, a game console, a robotic device, a wearable electronic device (e.g., an electronic watch, electronically modified glasses, altered-reality (AR) glasses, virtual reality (VR) glasses, among other things), a portable scanning device, a portable identifying device, a sporting good, an embedded sensor, an Internet of Things (IoT) sensor, IoT enabled clothing, IoT enabled recreational equipment, industrial equipment, medical equipment, a medical device a tablet computing device, a portable control device, a remote controller for an electronic device, a gaming controller, among other things.

For the purposes of illustrating the features and characteristics of the disclosed embodiments, arrow-ended lines are utilized to illustrate transferrable and/or communicative signals and various patterns are used to illustrate electrical signals that are intended for power transmission and electrical signals that are intended for the transmission of data and/or control instructions. Solid lines indicate signal transmission of electrical energy over a physical and/or wireless electrical connection, in the form of power signals that are, ultimately, utilized in wireless power transmission from the wireless transmission system 20 to the wireless receiver system 30. Further, dotted lines are utilized to illustrate electronically transmittable data signals, which ultimately may be wirelessly transmitted from the wireless transmission system 20 to the wireless receiver system 30.

While the systems and methods herein illustrate the transmission of wirelessly transmitted energy, wirelessly transmitted power, wirelessly transmitted electromagnetic energy, and electronically transmittable data, it is certainly contemplated that the systems, methods, and apparatus disclosed herein may be utilized in the transmission of only one signal, various combinations of two signals, or more than two signals and, further, it is contemplated that the systems, method, and apparatus disclosed herein may be utilized for wireless transmission of other electrical signals in addition to or uniquely in combination with one or more of the above mentioned signals. In some examples, the signal paths of solid or dotted lines may represent a functional signal path, whereas, in practical application, the actual signal is routed through additional components en route to its indicated destination. For example, it may be indicated that a data signal routes from a communications apparatus to another communications apparatus; however, in practical application, the data signal may be routed through an amplifier, then through a transmission antenna, to a receiver antenna, where, on the receiver end, the data signal is decoded by a respective communications device of the receiver.

Figure 2:
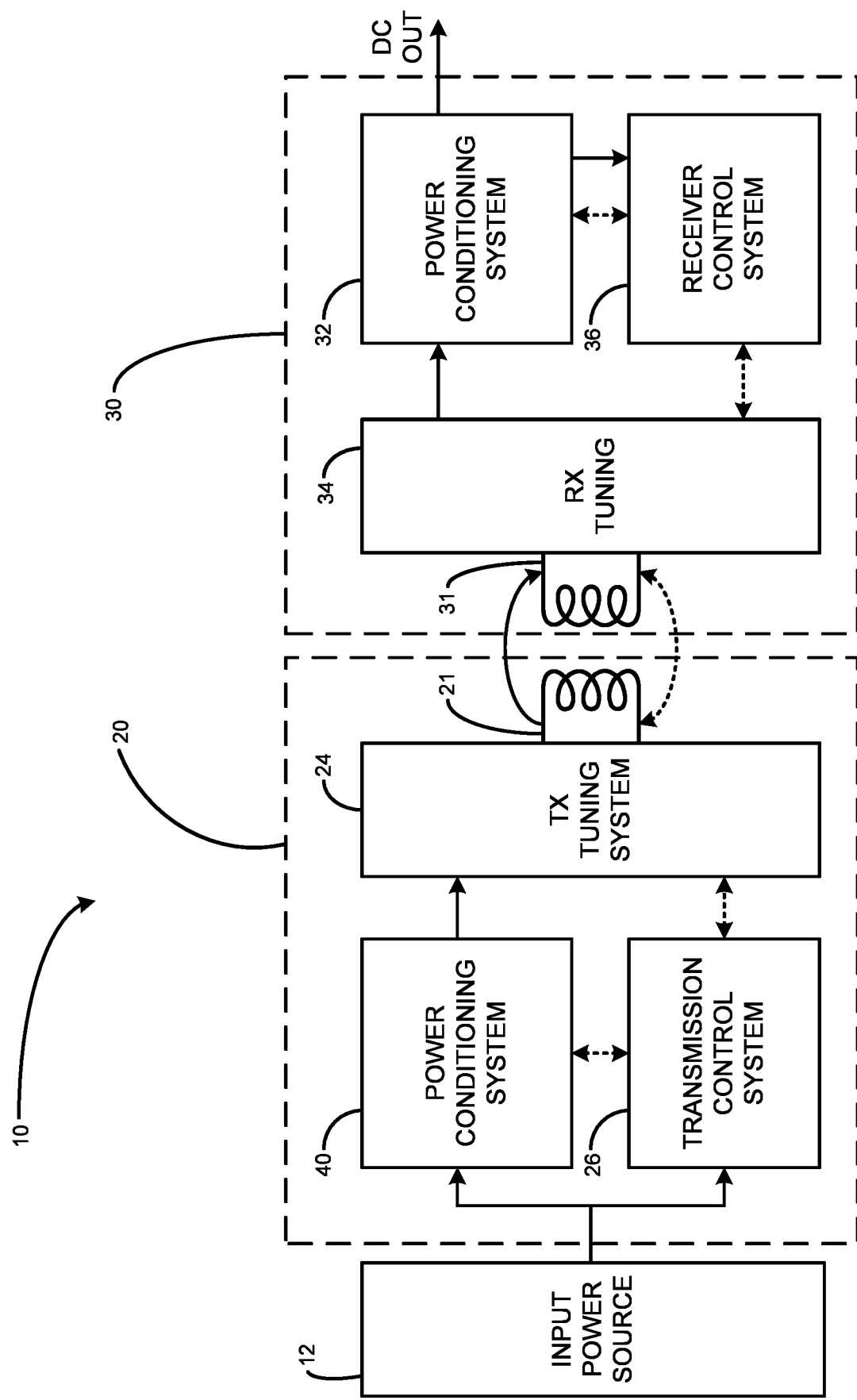
FIG. 2 is a block diagram illustrating components of a wireless transmission system of the system of FIG. 1 and a wireless receiver system of the system of FIG. 1, in accordance with FIG. 1 and the present disclosure.

Turning now to FIG. 2, the wireless connection system 10 is illustrated as a block diagram including example subsystems of both the wireless transmission system 20 and the wireless receiver system 30. The wireless transmission system 20 may include, at least, a power conditioning system 40, a transmission control system 26, a transmission tuning system 24, and the transmission antenna 21. A first portion of the electrical energy input from the input power source 12 is configured to electrically power components of the wireless transmission system 20 such as, but not limited to, the transmission control system 26. A second portion of the electrical energy input from the input power source 12 is conditioned and/or modified for wireless power transmission, to the wireless receiver system 30, via the transmission antenna 21. Accordingly, the second portion of the input energy is modified and/or conditioned by the power conditioning system 40. While not illustrated, it is certainly contemplated that one or both of the first and second portions of the input electrical energy may be modified, conditioned, altered, and/or otherwise changed prior to receipt by the power conditioning system 40 and/or transmission control system 26, by further contemplated subsystems (e.g., a voltage regulator, a current regulator, switching systems, fault systems, safety regulators, among other things).

Figure 3:
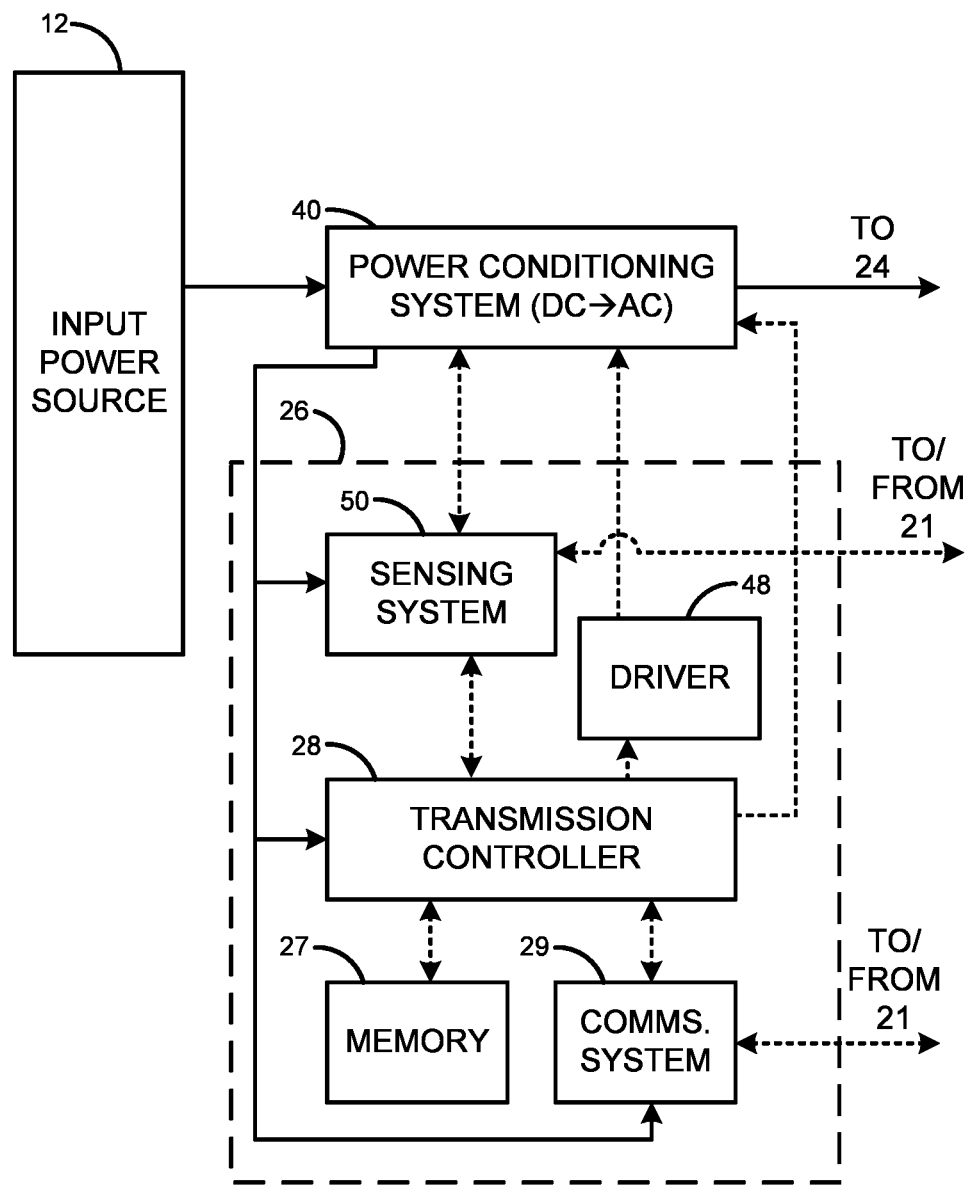
FIG. 3 is a block diagram illustrating components of a transmission control system of the wireless transmission system of FIG. 2, in accordance with FIG. 1, FIG. 2, and the present disclosure.

Referring now to FIG. 3, with continued reference to FIGS. 1 and 2, subcomponents and/or systems of the transmission control system 26 are illustrated. The transmission control system 26 may include a sensing system 50, a transmission controller 28, a communications system 29, a driver 48, and a memory 27.

The transmission controller 28 may be any electronic controller or computing system that includes, at least, a processor which performs operations, executes control algorithms, stores data, retrieves data, gathers data, controls and/or provides communication with other components and/or subsystems associated with the wireless transmission system 20, and/or performs any other computing or controlling task desired. The transmission controller 28 may be a single controller or may include more than one controller disposed to control various functions and/or features of the wireless transmission system 20. Functionality of the transmission controller 28 may be implemented in hardware and/or software and may rely on one or more data maps relating to the operation of the wireless transmission system 20. To that end, the transmission controller 28 may be operatively associated with the memory 27. The memory may include one or more of internal memory, external memory, and/or remote memory (e.g., a database and/or server operatively connected to the transmission controller 28 via a network, such as, but not limited to, the Internet). The internal memory and/or external memory may include, but are not limited to including, one or more of a read only memory (ROM), including programmable read-only memory (PROM), erasable programmable read-only memory (EPROM or sometimes but rarely labelled EROM), electrically erasable programmable read-only memory (EEPROM), random access memory (RAM), including dynamic RAM (DRAM), static RAM (SRAM), synchronous dynamic RAM (SDRAM), single data rate synchronous dynamic RAM (SDR SDRAM), double data rate synchronous dynamic RAM (DDR SDRAM, DDR2, DDR3, DDR4), and graphics double data rate synchronous dynamic RAM (GDDR SDRAM, GDDR2, GDDR3, GDDR4, GDDR5, a flash memory, a portable memory, and the like. Such memory media are examples of nontransitory machine readable and/or computer readable memory media.

While particular elements of the transmission control system 26 are illustrated as independent components and/or circuits (e.g., the driver 48, the memory 27, the communications system 29, the sensing system 50, among other contemplated elements) of the transmission control system 26, such components may be integrated with the transmission controller 28. In some examples, the transmission controller 28 may be an integrated circuit configured to include functional elements of one or both of the transmission controller 28 and the wireless transmission system 20, generally.

As illustrated, the transmission controller 28 is in operative association, for the purposes of data transmission, receipt, and/or communication, with, at least, the memory 27, the communications system 29, the power conditioning system 40, the driver 48, and the sensing system 50. The driver 48 may be implemented to control, at least in part, the operation of the power conditioning system 40. In some examples, the driver 48 may receive instructions from the transmission controller 28 to generate and/or output a generated pulse width modulation (PWM) signal to the power conditioning system 40. In some such examples, the PWM signal may be configured to drive the power conditioning system 40 to output electrical power as an alternating current signal, having an operating frequency defined by the PWM signal.

The sensing system may include one or more sensors, wherein each sensor may be operatively associated with one or more components of the wireless transmission system 20 and configured to provide information and/or data. The term "sensor" is used in its broadest interpretation to define one or more components operatively associated with the wireless transmission system 20 that operate to sense functions, conditions, electrical characteristics, operations, and/or operating characteristics of one or more of the wireless transmission system 20, the wireless receiving system 30, the input power source 12, the host device 11, the transmission antenna 21, the receiver antenna 31, along with any other components and/or subcomponents thereof.

Figure 4:
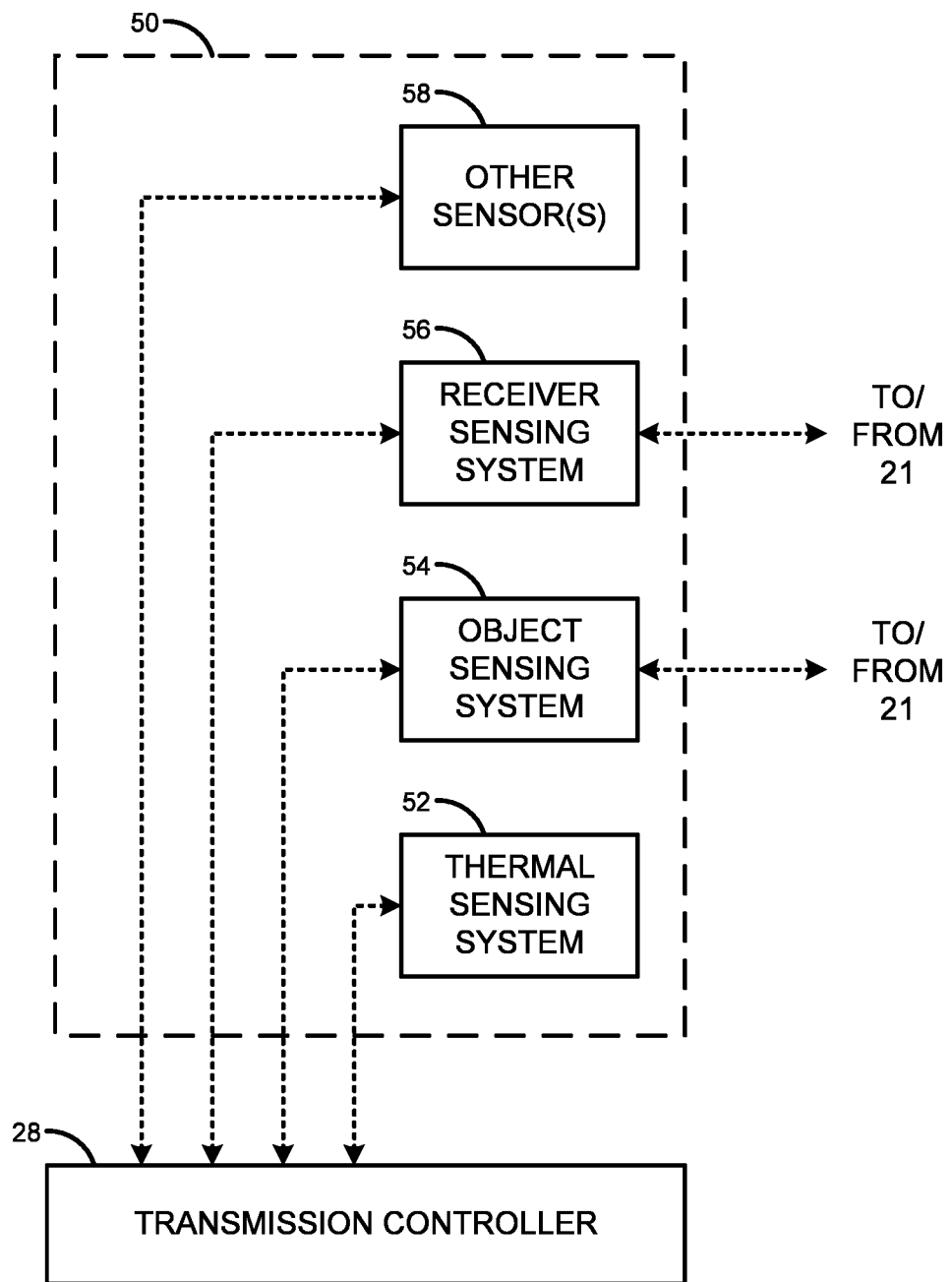
FIG. 4 is a block diagram illustrating components of a sensing system of the transmission control system of FIG. 3, in accordance with FIGS. 1-3 and the present disclosure.

As illustrated in the embodiment of FIG. 4, the sensing system 50 may include, but is not limited to including, a thermal sensing system 52, an object sensing system 54, a receiver sensing system 56, and/or any other sensor(s) 58. Within these systems, there may exist even more specific optional additional or alternative sensing systems addressing particular sensing aspects required by an application, such as, but not limited to: a condition-based maintenance sensing system, a performance optimization sensing system, a state-of-charge sensing system, a temperature management sensing system, a component heating sensing system, an IoT sensing system, an energy and/or power management sensing system, an impact detection sensing system, an electrical status sensing system, a speed detection sensing system, a device health sensing system, among others. The object sensing system 54, may be a foreign object detection (FOD) system.

Each of the thermal sensing system 52, the object sensing system 54, the receiver sensing system 56 and/or the other sensor(s) 58, including the optional additional or alternative systems, are operatively and/or communicatively connected to the transmission controller 28. The thermal sensing system 52 is configured to monitor ambient and/or component temperatures within the wireless transmission system 20 or other elements nearby the wireless transmission system 20. The thermal sensing system 52 may be configured to detect a temperature within the wireless transmission system 20 and, if the detected temperature exceeds a threshold temperature, the transmission controller 28 prevents the wireless transmission system 20 from operating. Such a threshold temperature may be configured for safety considerations, operational considerations, efficiency considerations, and/or any combinations thereof. In a non-limiting example, if, via input from the thermal sensing system 52, the transmission controller 28 determines that the temperature within the wireless transmission system 20 has increased from an acceptable operating temperature to an undesired operating temperature (e.g., in a non-limiting example, the internal temperature increasing from about 20° Celsius (C) to about 50° C., the transmission controller 28 prevents the operation of the wireless transmission system 20 and/or reduces levels of power output from the wireless transmission system 20. In some non-limiting examples, the thermal sensing system 52 may include one or more of a thermocouple, a thermistor, a negative temperature coefficient (NTC) resistor, a resistance temperature detector (RTD), and/or any combinations thereof.

As depicted in FIG. 4, the transmission sensing system 50 may include the object sensing system 54. The object sensing system 54 may be configured to detect presence of unwanted objects in contact with or proximate to the wireless transmission system 20. In some examples, the object sensing system 54 is configured to detect the presence of an undesired object. In some such examples, if the transmission controller 28, via information provided by the object sensing system 54, detects the presence of an undesired object, then the transmission controller 28 prevents or otherwise modifies operation of the wireless transmission system 20. In some examples, the object sensing system 54 utilizes an impedance change detection scheme, in which the transmission controller 28 analyzes a change in electrical impedance observed by the transmission antenna 20 against a known, acceptable electrical impedance value or range of electrical impedance values.

Additionally or alternatively, the object sensing system 54 may utilize a quality factor (Q) change detection scheme, in which the transmission controller 28 analyzes a change from a known quality factor value or range of quality factor values of the object being detected, such as the receiver antenna 31. The "quality factor" or "Q" of an inductor can be defined as (frequency (Hz)×inductance (H))/resistance (ohms), where frequency is the operational frequency of the circuit, inductance is the inductance output of the inductor and resistance is the combination of the radiative and reactive resistances that are internal to the inductor. "Quality factor," as defined herein, is generally accepted as an index (figure of measure) that measures the efficiency of an apparatus like an antenna, a circuit, or a resonator. In some examples, the object sensing system 54 may include one or more of an optical sensor, an electro-optical sensor, a Hall effect sensor, a proximity sensor, and/or any combinations thereof.

The receiver sensing system 56 is any sensor, circuit, and/or combinations thereof configured to detect presence of any wireless receiving system that may be couplable with the wireless transmission system 20. In some examples, if the presence of any such wireless receiving system is detected, wireless transmission of electrical energy, electrical power, electromagnetic energy, and/or data by the wireless transmission system 20 to said wireless receiving system is enabled. In some examples, if the presence of a wireless receiver system is not detected, wireless transmission of electrical energy, electrical power, electromagnetic energy, and/or data is prevented from occurring. Accordingly, the receiver sensing system 56 may include one or more sensors and/or may be operatively associated with one or more sensors that are configured to analyze electrical characteristics within an environment of or proximate to the wireless transmission system 20 and, based on the electrical characteristics, determine presence of a wireless receiver system 30.

Figure 5:
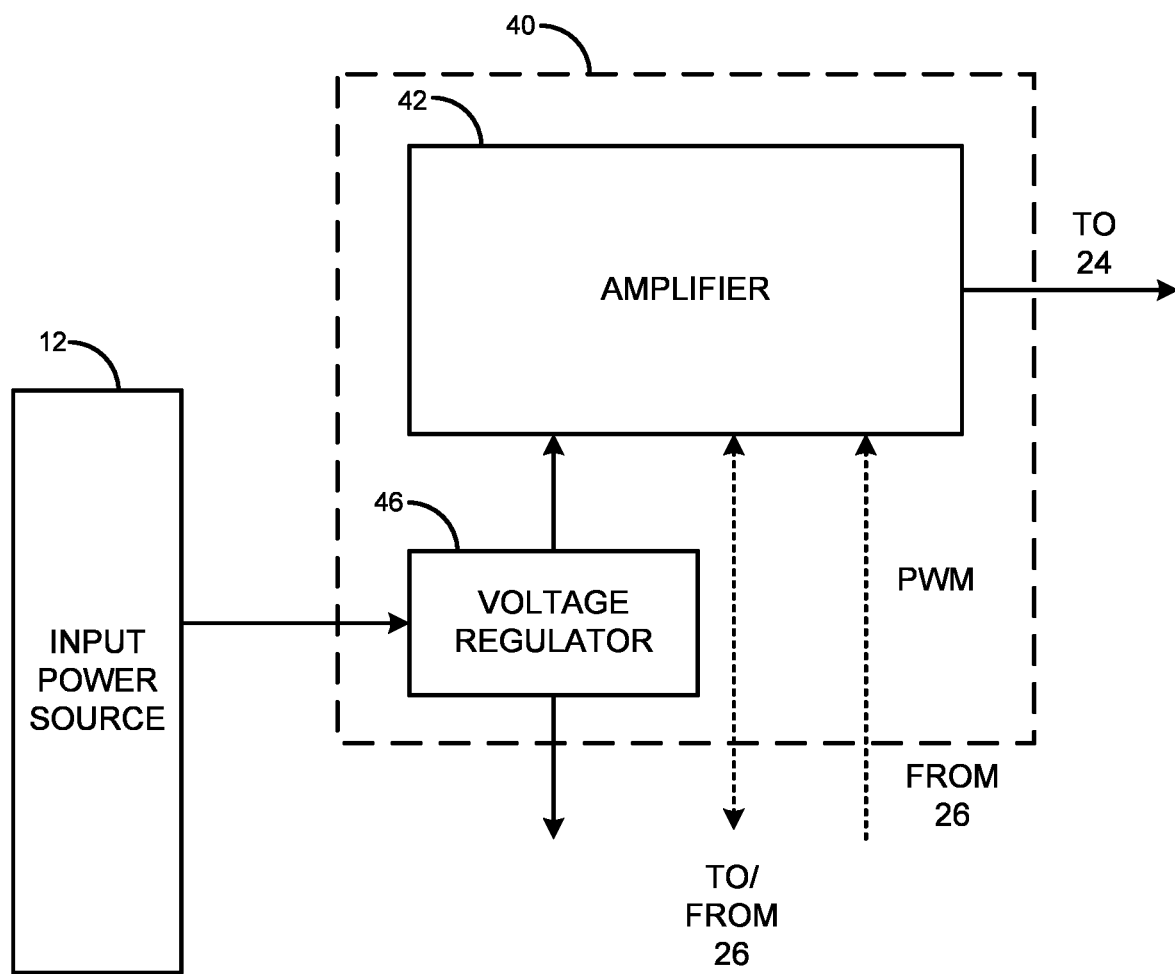
FIG. 5 is a block diagram illustrating components of a power conditioning system of the wireless transmission system of FIG. 2, in accordance with FIG. 1, FIG. 2, and the present disclosure.

Referring now to FIG. 5, and with continued reference to FIGS. 1-4, a block diagram illustrating a first embodiment of the power conditioning system 40 is illustrated. At the power conditioning system 40, electrical power is received, generally, as a direct current (DC) power source, via the input power source 12 itself or an intervening power converter, converting an AC source to a DC source (not shown). A voltage regulator 46 receives the electrical power from the input power source 12 and is configured to provide electrical power for transmission by the antenna 21 and provide electrical power for powering components of the wireless transmission system 21. Accordingly, the voltage regulator 46 is configured to convert the received electrical power into at least two electrical power signals, each at a proper voltage for operation of the respective downstream components: a first electrical power signal to electrically power any components of the wireless transmission system 20 and a second portion conditioned and modified for wireless transmission to the wireless receiver system 30. As illustrated in FIG. 3, such a first portion is transmitted to, at least, the sensing system 50, the transmission controller 28, and the communications system 29; however, the first portion is not limited to transmission to just these components and can be transmitted to any electrical components of the wireless transmission system 20.

The second portion of the electrical power is provided to an amplifier 42 of the power conditioning system 40, which is configured to condition the electrical power for wireless transmission by the antenna 21. The amplifier may function as an invertor, which receives an input DC power signal from the voltage regulator 46 and generates an alternating current (AC) as output, based, at least in part, on PWM input from the transmission control system 26. The amplifier 42 may be or include, for example, a power stage inverter, such as a dual field effect transistor power stage invertor. The use of the amplifier 42 within the power conditioning system 40 and, in turn, the wireless transmission system 20 enables wireless transmission of electrical signals having much greater amplitudes than if transmitted without such an amplifier. For example, the addition of the amplifier 42 may enable the wireless transmission system 20 to transmit electrical energy as an electrical power signal having electrical power from about 10 mW to about 500 W.

In some examples, the amplifier 42 may be or may include one or more class-E power amplifiers. Class-E power amplifiers are efficiently tuned switching power amplifiers designed for use at high frequencies (e.g., frequencies from about 1 MHz to about 1 GHz). Generally, a class-E amplifier employs a single-pole switching element and a tuned reactive network between the switch and an output load (e.g., the antenna 21). Class E amplifiers may achieve high efficiency at high frequencies by only operating the switching element at points of zero current (e.g., on-to-off switching) or zero voltage (off to on switching). Such switching characteristics may minimize power lost in the switch, even when the switching time of the device is long compared to the frequency of operation. However, the amplifier 42 is certainly not limited to being a class-E power amplifier and may be or may include one or more of a class D amplifier, a class EF amplifier, an H invertor amplifier, among other amplifiers that could be included as part of the amplifier 42.

Returning now to FIG. 2, the conditioned signal(s) from the power conditioning system 40 is then received by the transmission tuning system 24, prior to transmission by the antenna. The transmission tuning system 24 may include tuning and/or impedance matching, filters (e.g. a low pass filter, a high pass filter, a "pi" or "H" filter, a "T" filter, an "L" filter, a "LL" filter, an L-C trap filter, among other filters), network matching, sensing, and/or conditioning elements configured to optimize wireless transfer of signals from the wireless transmission system 20 to the wireless receiver system 30. Further, the transmission tuning system 24 may include an impedance matching circuit, which is designed to match impedance with a corresponding wireless receiver system 30 for given power, current, and/or voltage requirements for wireless transmission of one or more of electrical energy, electrical power, electromagnetic energy, and electronic data.

Figure 6:
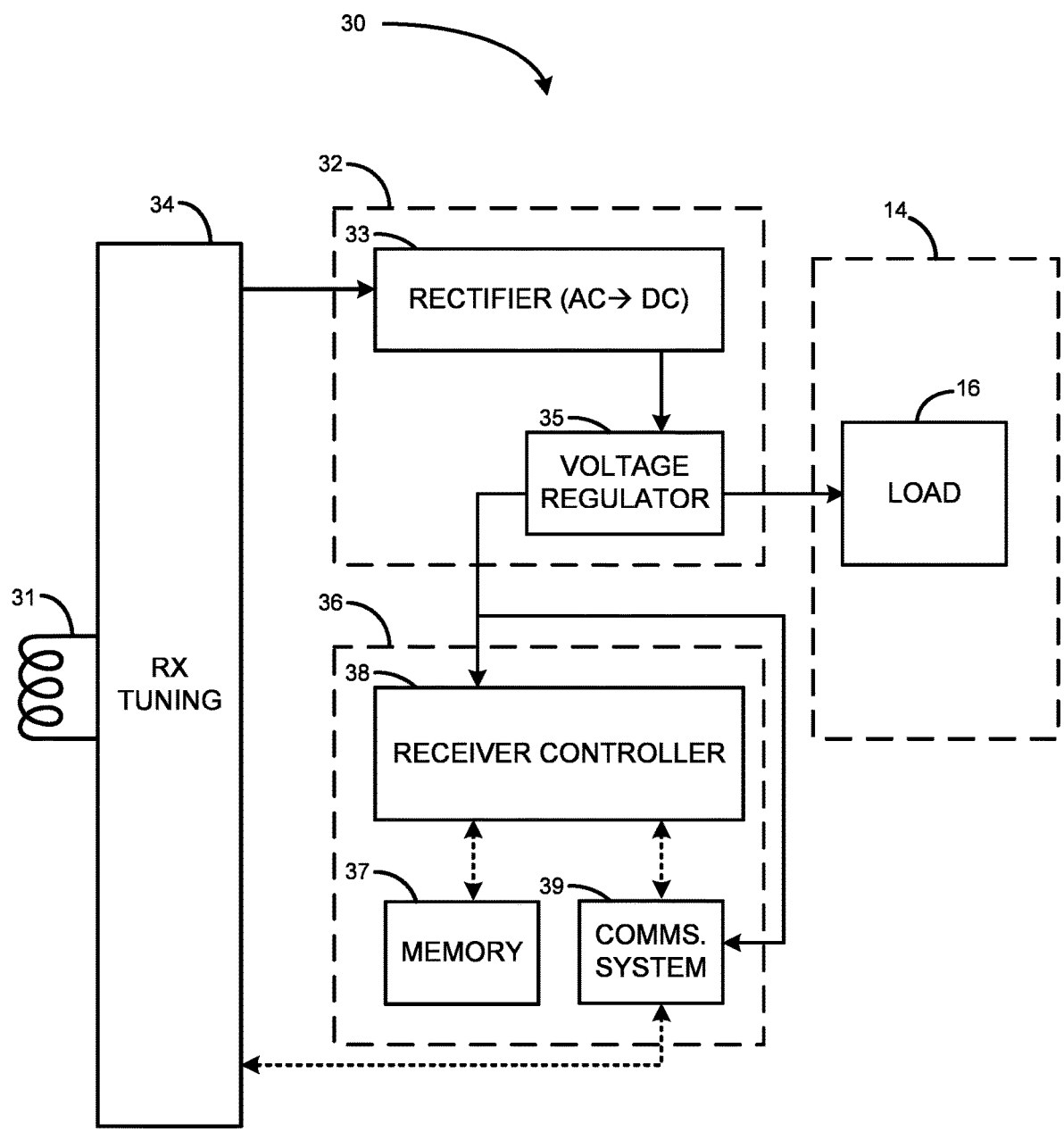
FIG. 6 is a block diagram illustrating components of a receiver control system and a receiver power conditioning system of the wireless receiver system of FIG. 2, in accordance with FIG. 1, FIG. 2, and the present disclosure.

Turning now to FIG. 6 and with continued reference to, at least, FIGS. 1 and 2, the wireless receiver system 30 is illustrated in further detail. The wireless receiver system 30 is configured to receive, at least, electrical energy, electrical power, electromagnetic energy, and/or electrically transmittable data via near field magnetic coupling from the wireless transmission system 20, via the transmission antenna 21. As illustrated in FIG. 6, the wireless receiver system 30 includes, at least, the receiver antenna 31, a receiver tuning system 34, a power conditioning system 32, and a receiver control system 36. The receiver tuning system 34 may be configured to substantially match the electrical impedance of the wireless transmission system 20. In some examples, the receiver tuning system 34 may be configured to dynamically adjust and substantially match the electrical impedance of the receiver antenna 31 to a characteristic impedance of the power generator or the load at a driving frequency of the transmission antenna 20.

As illustrated, the power conditioning system 32 includes a rectifier 33 and a voltage regulator 35. In some examples, the rectifier 33 is in electrical connection with the receiver tuning system 34. The rectifier 33 is configured to modify the received electrical energy from an alternating current electrical energy signal to a direct current electrical energy signal. In some examples, the rectifier 33 is comprised of at least one diode. Some non-limiting example configurations for the rectifier 33 include, but are not limited to including, a full wave rectifier, including a center tapped full wave rectifier and a full wave rectifier with filter, a half wave rectifier, including a half wave rectifier with filter, a bridge rectifier, including a bridge rectifier with filter, a split supply rectifier, a single phase rectifier, a three phase rectifier, a controlled rectifier, an uncontrolled rectifier, and a half controlled rectifier. As electronic devices may be sensitive to voltage, additional protection of the electronic device may be provided by clipper circuits or devices. The rectifier 33 may further include a clipper circuit or a clipper device. A clipper is herein defined as a circuit or device that removes either the positive half (top half), the negative half (bottom half), or both the positive and the negative halves of an input AC signal. In other words, a clipper is a circuit or device that limits the positive amplitude, the negative amplitude, or both the positive and the negative amplitudes of the input AC signal.

Some non-limiting examples of a voltage regulator 35 include, but are not limited to, including a series linear voltage regulator, a shunt linear voltage regulator, a step up switching voltage regulator, a step down switching voltage regulator, an inverter voltage regulator, a Zener controlled transistor series voltage regulator, and an emitter follower voltage regulator. The voltage regulator 35 may further include a voltage multiplier. A voltage multiplier is herein defined as an electronic circuit or device that delivers an output voltage having an amplitude (peak value) that is two, three, or more times greater than the amplitude (peak value) of the input voltage. The voltage regulator 35 is in electrical connection with the rectifier 33 and configured to adjust the amplitude of the electrical voltage of the wirelessly received electrical energy signal, after conversion to AC by the rectifier 33. In some examples, the voltage regulator 35 may be a low dropout linear voltage regulator; however, other voltage regulation circuits and/or systems are contemplated. As illustrated, the direct current electrical energy signal output by the voltage regulator 35 is received at the load 16 of the electronic device 14. In some examples, a portion of the direct current electrical power signal may be utilized to power the receiver control system 36 and any components thereof; however, it is certainly possible that the receiver control system 36, and any components thereof, may be powered and/or receive signals from the load 16 and/or other components of the electronic device 14.

The receiver control system 36 may include, but is not limited to, including a receiver controller 38, a communications system 39, and a memory 37. The receiver controller 38 may be any electronic controller or computing system that includes, at least, a processor which performs operations, executes control algorithms, stores data, retrieves data, gathers data, controls and/or provides communication with other components and/or subsystems associated with the wireless receiver system 30. The receiver controller 38 may be a single controller or may include more than one controller disposed to control various functions and/or features of the wireless receiver system 30. Functionality of the transmission controller 38 may be implemented in hardware and/or software and may rely on one or more data maps relating to the operation of the wireless receiver system 30. To that end, the receiver controller 38 may be operatively associated with the memory 37. The memory may include one or both of internal memory, external memory, and/or remote memory (e.g., a database and/or server operatively connected to the receiver controller 28 via a network, such as, but not limited to, the Internet). The internal memory and/or external memory may include, but are not limited to including, one or more of a read only memory (ROM), including programmable read-only memory (PROM), erasable programmable read-only memory (EPROM or sometimes but rarely labelled EROM), electrically erasable programmable read-only memory (EEPROM), random access memory (RAM), including dynamic RAM (DRAM), static RAM (SRAM), synchronous dynamic RAM (SDRAM), single data rate synchronous dynamic RAM (SDR SDRAM), double data rate synchronous dynamic RAM (DDR SDRAM, DDR2, DDR3, DDR4), and graphics double data rate synchronous dynamic RAM (GDDR SDRAM, GDDR2, GDDR3, GDDR4, GDDR5, a flash memory, a portable memory, and the like. Such memory media are examples of nontransitory computer readable memory media.

Further, while particular elements of the receiver control system 36 are illustrated as independent components and/or circuits (e.g., the memory 37, the communications system 39, among other contemplated elements) of the receiver control system 36, such components may be integrated with the receiver controller 38. In some examples, the receiver controller 38 may be and/or include one or more integrated circuits configured to include functional elements of one or both of the receiver controller 38 and the wireless receiver system 30, generally. "Integrated circuits," as defined herein, generally refers to a circuit in which all or some of the circuit elements are inseparably associated and electrically interconnected so that it is considered to be indivisible for the purposes of construction and commerce. Such integrated circuits may include, but are not limited to including, thin-film transistors, thick-film technologies, and/or hybrid integrated circuits.

In some examples, the communications system 39 may be a dedicated circuit configured to send and receive data at a given operating frequency. For example, the communications system 39 may be a tagging or identifier integrated circuit, such as, but not limited to, an NFC tag and/or labelling integrated circuit. Examples of such NFC tag and/or labelling integrated circuits include the NTAG® family of integrated circuits manufactured by NXP Semiconductors N.V. Additionally or alternatively, the communications system 39 may include Bluetooth® communications components, WiFi communications components, TransferJet™ communications components, among other contemplated out of band communications components. However, the communications system 39 is certainly not limited to these example components and, in some examples, the communications system 39 may be implemented with another integrated circuit (e.g., integrated with the receiver controller 38), may be another transceiver of or operatively associated with one or both of the electronic device 14 and the wireless receiver system 30, among other contemplated communication systems and/or apparatus. Further, in some examples, functions of the communications system 39 may be integrated with the receiver controller 39, such that the controller modifies the inductive field between the antennas 21, 31 to communicate in the frequency band of wireless power transfer operating frequency.

Figure 7:
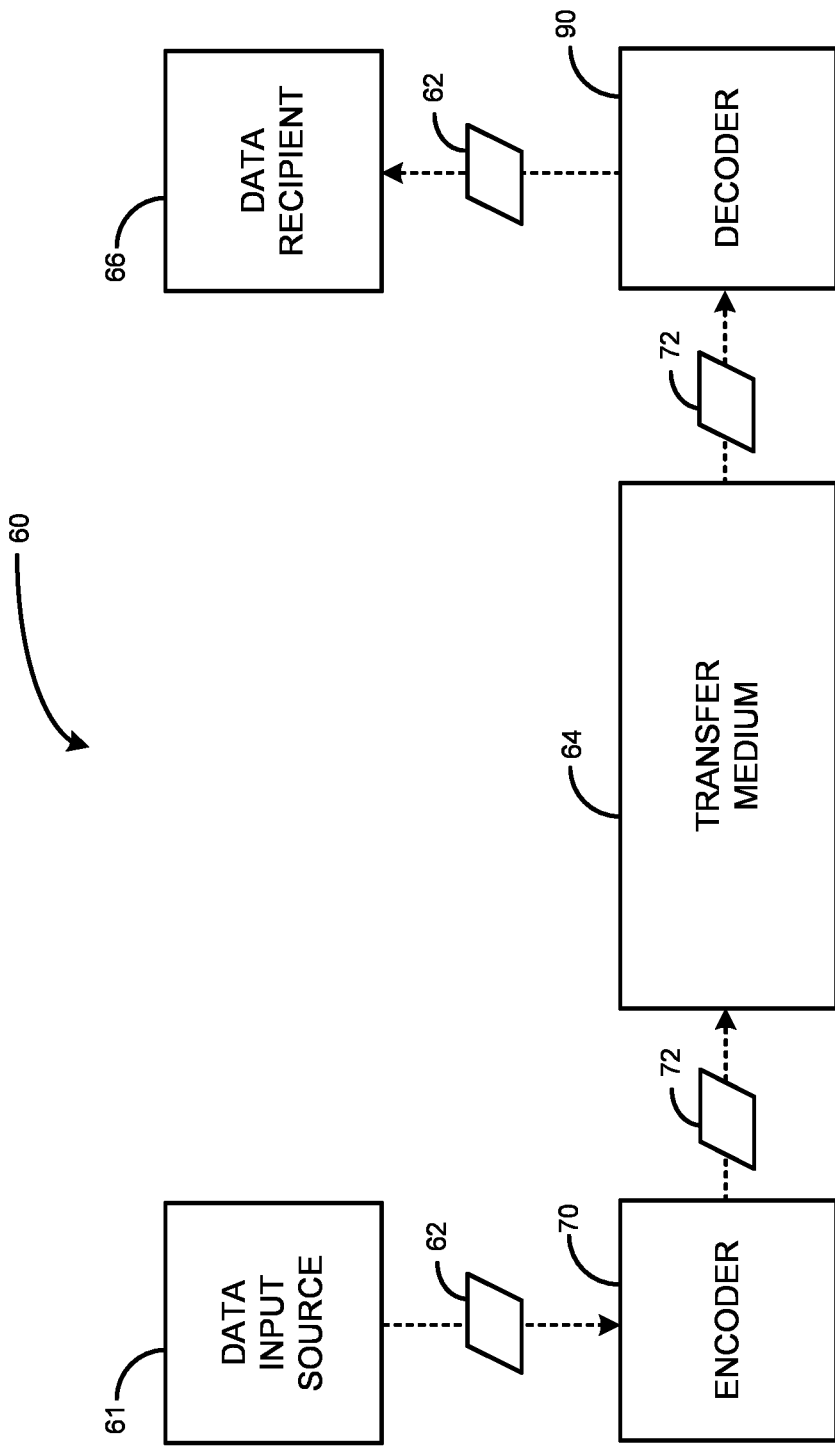
FIG. 7 is a block diagram for an exemplary data communications system, in accordance with an embodiment of the present disclosure

Turning now to FIG. 7, a schematic block diagram for a data communications system 60 is illustrated. The data communications system 60 operates by encoding a message using pulse width encoding, as will be discussed in greater detail below. Accordingly, any elements of the data communication system 60 may be implemented by one or more apparatus, hardware, software, firmware, and any combinations thereof. To that end, the data communications system 60 and any components thereof may be comprised of or be performed by any electronic controller or computing system that includes, at least, a processor which performs operations, executes control algorithms, stores data, retrieves data, gathers data, controls and/or provides communication with other components and/or subsystems associated with the data communications system 60 and any components thereof. The data communications system 60 may be implemented by a single controller or may include more than one controller disposed to control various functions and/or features of the data communications system 60 and any components thereof. Functionality of the data communications system 60 and any components thereof may be implemented in hardware and/or software and may rely on one or more data maps relating to the operation of the wireless receiver system 60 and any components thereof. To that end, the data communications system 60 and any components thereof may be operatively associated with a memory. The memory may include one or both of internal memory, external memory, and/or remote memory (e.g., a database and/or server operatively connected to the data communications system 60 and any components thereof via a network, such as, but not limited to, the Internet). The internal memory and/or external memory may include, but are not limited to including, one or more of a read only memory (ROM), including programmable read-only memory (PROM), erasable programmable read-only memory (EPROM or sometimes but rarely labelled EROM), electrically erasable programmable read-only memory (EEPROM), random access memory (RAM), including dynamic RAM (DRAM), static RAM (SRAM), synchronous dynamic RAM (SDRAM), single data rate synchronous dynamic RAM (SDR SDRAM), double data rate synchronous dynamic RAM (DDR SDRAM, DDR2, DDR3, DDR4), and graphics double data rate synchronous dynamic RAM (GDDR SDRAM, GDDR2, GDDR3, GDDR4, GDDR5, a flash memory, a portable memory, and the like. Such memory media are examples of nontransitory computer readable memory media.

The data communications system 60 may be utilized to provide communications in conjunction with wireless power transfer systems, such as those discussed above, which will be discussed in greater detail below. However, it is certainly contemplated that the data communications system 60 may be utilized in any wireless or wired communications system, wherein pulse width encoding is optimal for achieving greater data rates, reduce bill of materials, provide asynchronous data communications, provide data communications absent a clock, and/or provide data communications with a medium susceptible to unreliable and/or inconsistent data rates among other things.

Operations of the data communications system 61 begin, generally, when a data input source 61 provides a message 62. The message 62 may be any encodable data desired for communications, ultimately, to a data recipient 66. The message 62 is encoded by the encoder 70, using a coding format (examples and more detail, below) to generate an encoded message 72. The encoded message is transferred to a decoder 90 over a transfer medium 64. The transfer medium 64 may be any medium, about which data is transferable; examples of transfer mediums that may comprise or be included as part of the transfer medium 64 include, but are not limited to including, a wireless connection, an electromagnetic connection, an electrical connection, a wireless electrical connection, an Internet connection, an Ethernet connection, a wired electrical connection, a wire, a trace, among other transfer media. Upon transfer via the transfer medium 64, the encoded message 72 is received by the decoder 90. The decoder 90 utilizes the same coding format as the encoder 70 to then decode the encoded message to reproduce the message 62, for receipt by the data recipient 66.

Figure 8:
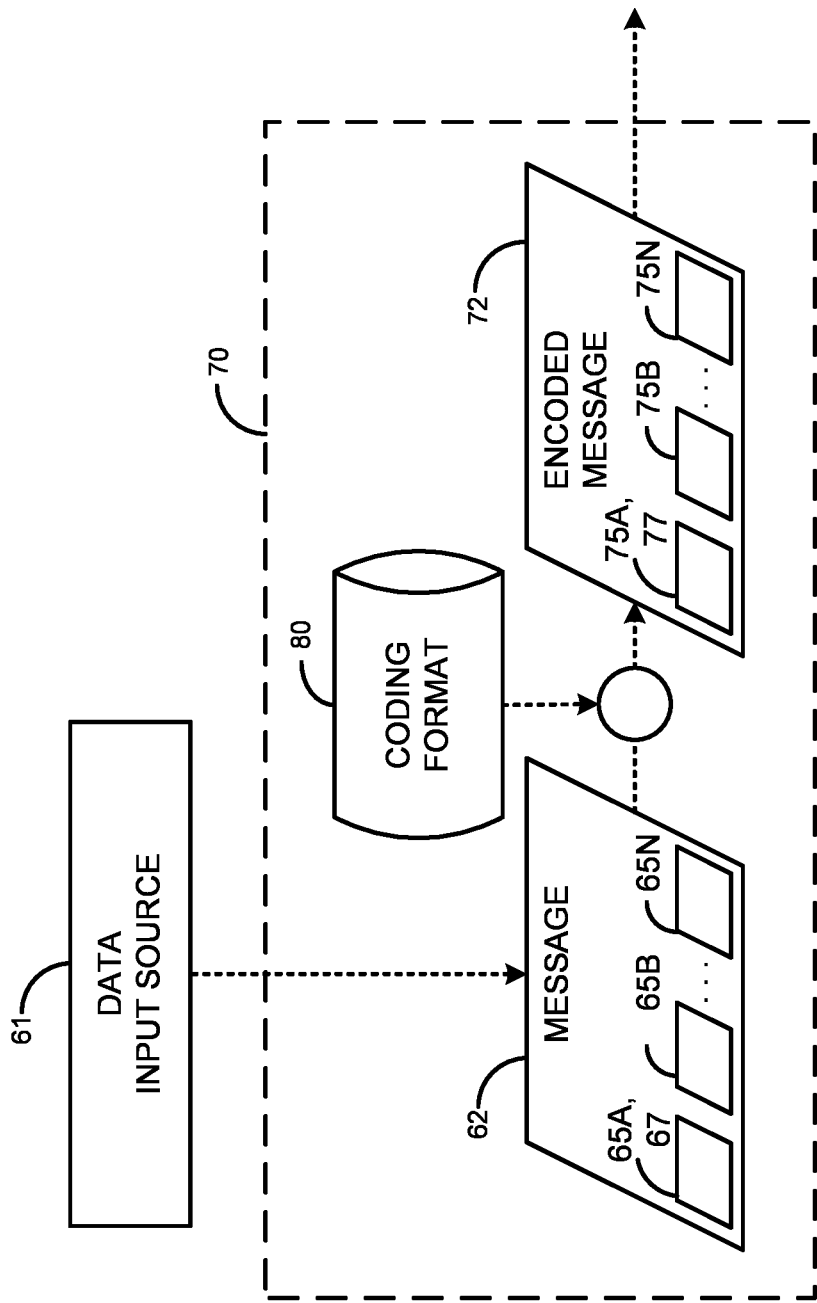
FIG. 8 is a block diagram illustrating components and/or data associated with an encoder of the exemplary data communications system of FIG. 7, in accordance with an embodiment of the present disclosure.

Returning now to the encoder 70, as illustrated in greater detail in FIG. 8, the encoder receives the message 62 from the data input source 61. The message 62 may be any data message of any length, size, duration, and any combinations thereof. Further, the message signal includes one or more message words 65. A "message word," as defined herein, refers to a fixed-size piece of data handled by an instruction set and/or a hardware device associated with data communications. A "message word" may be of any word length, word size, and/or word width, in accordance with its associated instruction set and/or associated hardware device. The size of a "message word" may be constrained by hardware and/or software limitations; therefore, it is advantageous for the encoder 70, in conjunction with the coding format 80, to implement intelligent instruction set that may be tailored to the specifications of hardware and/or software constraints. While it will be illustrated below that the example message words 65 may have a one-bit or two-bit binary format, the message words 62 are certainly not limited to having such binary formats and may be of any desired messaging format including, but not limited to including, higher bit binary formats (e.g., 4-bit binary, 8-bit binary, 16-bit binary, . . . , up to 2n-bit binary, for any integer "n"), base-8 or hexa- decimal messages (including single or multiple digits), base-10 or decimal messages (including single or multiple digits), alphanumeric messages (including single or multiple alphanumeric characters), ASCII messages (including single or multiple ASCII characters), among other forms of transferable data messages.

Figure 9:
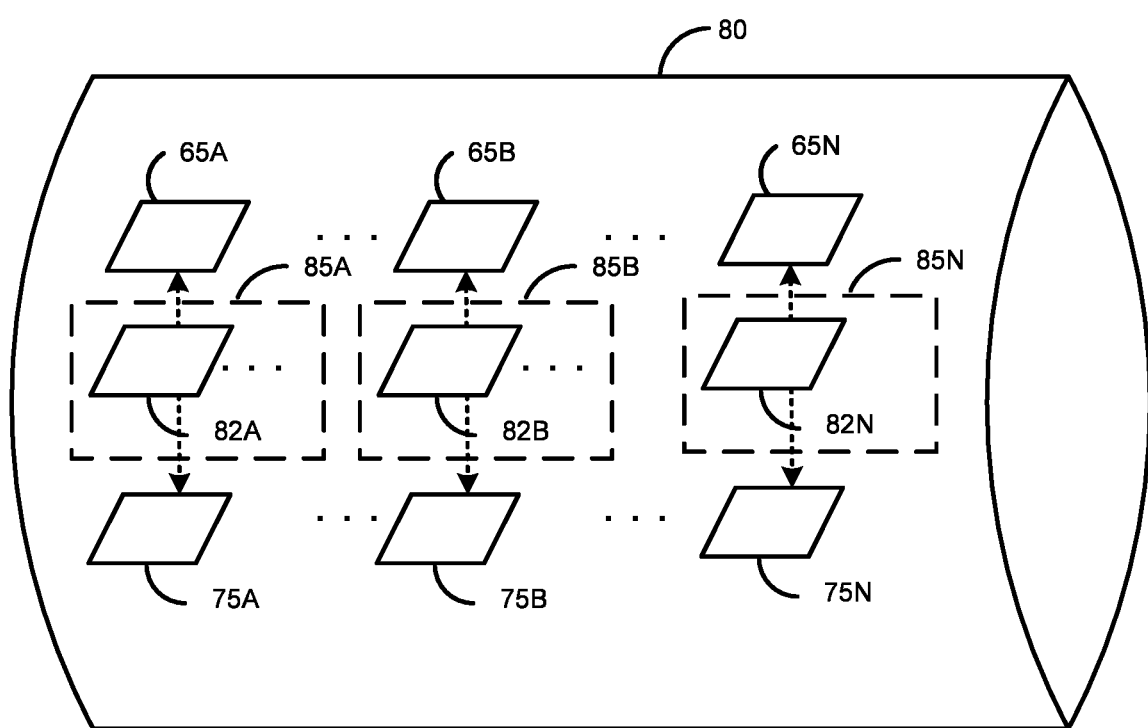
FIG. 9 is a block diagram illustrating components and/or data associated with a coding format utilized within the data communications system and/or the encoder and a decoder of the exemplary data communications system, in accordance with FIGS. 7, 8 and the present disclosure.

The diverse array of potential messages for the message words 65 is enabled by the system 60 utilizing the coding format 80 to encode the message words 65 to generate the encoded message 72, which includes a plurality of encoded words 75. The coding format 80 is illustrated in greater detail in the block diagram of FIG. 9. The coding format 80 correlates a plurality of correlated ratios 85, respectively, with a plurality of format words 82, wherein each of the plurality of correlated ratios is a ratio of a duty cycle of a pulse to a respective period associated with one or both of the duty cycle and the pulse. The format words 82 have a like format to the format of the message words 62 (e.g., if the message words 62 are in binary, then the format words 82 are in binary). The coding format 80 reads the message word 62, relates it to a stored format word 82, then outputs an encoded word 72, based on the message word 62, which is a pulse having a pulse width that is the correlated ratio 85, of the format word 82, multiplied by a period of the pulse. This may be better understood, in relation to the exemplary embodiment of FIGS. 10-11A-C.

Figure 10:
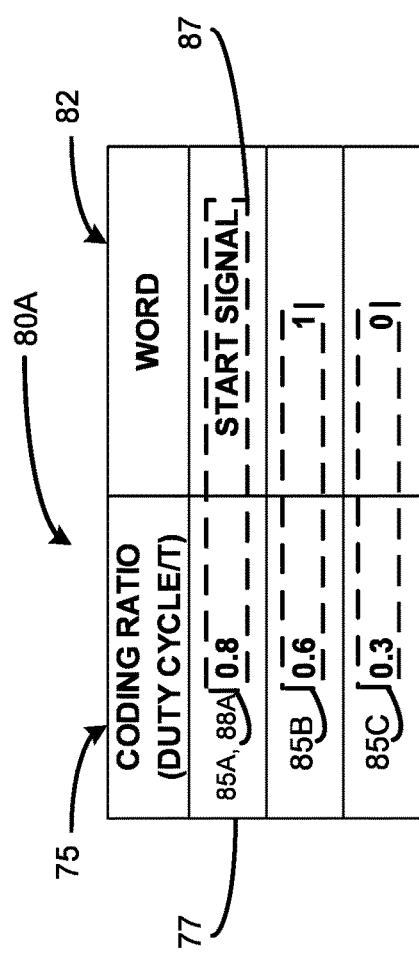
FIG. 10 is an example table illustrating a non-limiting example of data contained in the coding format of FIG. 9, in accordance with FIGS. 7-9 and the present disclosure.

FIG. 10 illustrates an exemplary coding format 80A, as illustrated as a table and as a coding format 80A, having a one-bit binary format. As illustrated, the format words 82 include three format words, a start signal, 0, and 1. The start signal may be a format start word 87 that correlates to a start word 67 of the message signal 62, the start word 67 indicating that the input data source 61 intends to send a message. Accordingly, the start word 67 and/or the format start word 87 are associated with a start correlated ratio 88, which is correlated with both the start word 67 and the start format word 87.

The encoded words 75 are output as ratios of the duty cycle of a pulse to the pulse's respective period, such output is received by a controller and, for example, a signal is modulated to include the pulses having widths of the encoded words 75. By utilizing percentages of a period of a pulse to encode a message 62, the decoder 90 only needs to know the coding format 80, it need not be synchronized by a clock of the signal. Therefore, the signal communications disclosed herein may be "un-clocked" and/or asynchronous communicative signals. An "un-clocked" communication signal, as defined herein, refers to a signal that does not require an oscillating clock signal to synchronize a sender of a message with the receiver of said message.

As pulse width encoding using correlated ratios 85 have an unlimited number of possibilities for fields in the coding format (e.g., pairs of correlated ratios 85 to format words 82), the only limit to the size of the coding format, within a single bit, is the granularity of the hardware and/or software utilized to implement the encoder 70 and/or the decoder 90. Therefore, data rates using such pulse width encoding of the system 60 may enable faster data communications using less expensive, legacy hardware, when compared to utilizing legacy coding methods (e.g., Manchester coding, on-off-keying, among other things).

Figure 11A:
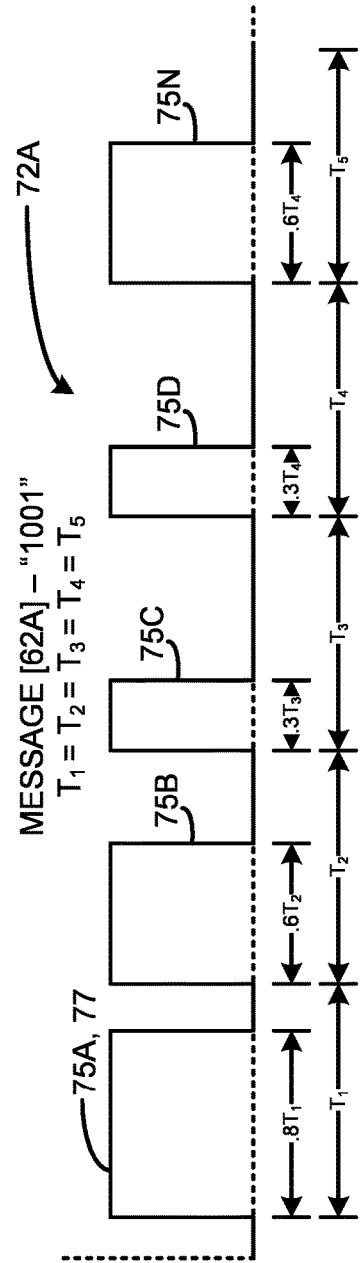
FIG. 11A is an example plot illustrating pulses of a pulse width encoded message transmitted within the exemplary data communications system of FIG. 7 and in accordance with the exemplary coding format of FIG. 10, in accordance with FIGS. 7-10 and the present disclosure.

To further illustrate the data communications of the system 60, visually, a sample encoded word 72A is illustrated in FIG. 11A. The message 62A is "1001." Accordingly, the encoder 70 will reference the coding format 80 to extract correlated percentages 85, which correlate each of the message words 65 of the message 65A, to generate the encoded message 72A as a pulse-width encoded message 72A. As illustrated in the example of FIG. 11A, the period of the pulses of the pulse-width encoded message 72A are substantially equal. As illustrated, each pulse has a width that corresponds to the ratio of the duty cycle of each pulse for each encoded word 77 (e.g., start correlated ratio is $0.8T_1$, "1" is $0.6T_2$, "0" is $0.3 T_3$, "0" is $0.3T_4$, and "1" is $0.6T_5$).

Figure 11B:
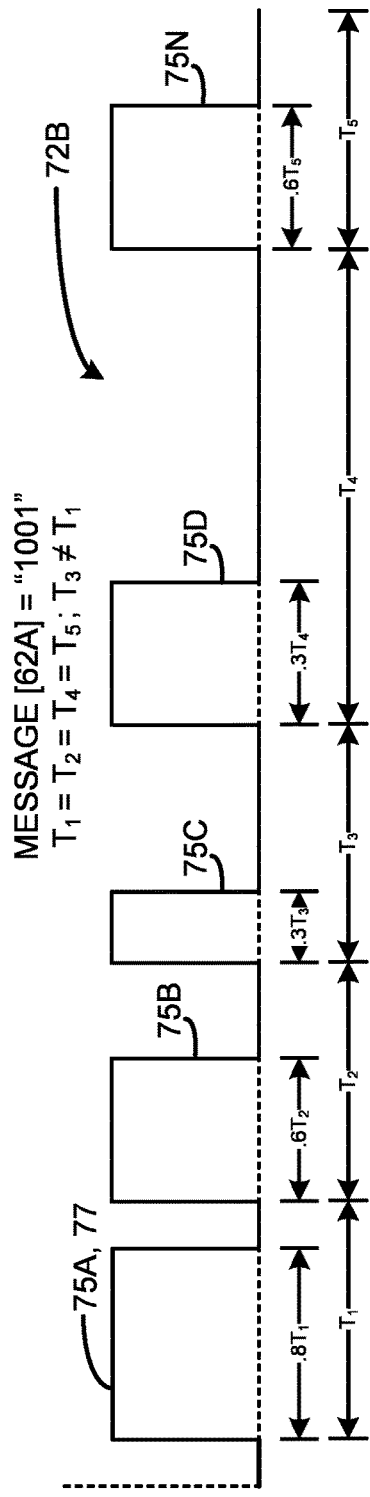
FIG. 11B is another example plot illustrating pulses of the same pulse width encoded message transmitted of FIG. 11B, but with varying periods, within the exemplary data communications system of FIG. 8 and in accordance with the exemplary coding format of FIG. 10, in accordance with FIGS. 7-10 and the present disclosure.

While it is certainly possible that a message encoded and decoded with the system 60 may have a consistent data rate and, thus, the period "T" for the entire encoded message 72 will remain equal, a distinct advantage of the system 60 is that data communications fidelity is maintained, even when data rates are uneven. To that end, FIG. 11B illustrates the same message "1001" with the same coding format 80, however the data rate appears to have a slight drop, wherein $T_3$ is indicating a slower data rate at the transmission of the specific encoded word 75D. While, visually, the plot of the encoded message 72B indicates something different from the encoded message 72A of FIG. 11A, the encoded message 72B is identical to the encoded message 72A, as the encoding is independent of data rate and/or the pulse period. "Independent of data rate" refers to signal communication conditions wherein a sender of a message and a receiver of said message do not have to operate at a common and/or consistent rate of transfer of data between sender and receiver. As illustrated, as with FIG. 11A, each pulse has a width that corresponds to the ratio of the duty cycle of each pulse for each encoded word 77 (e.g., start correlated ratio is $0.8T_1$, "1" is $0.6T_2$, "0" is $0.3 T_3$, "0" is $0.3T_4$, and "1" is $0.6T_5$).

Figure 11C:
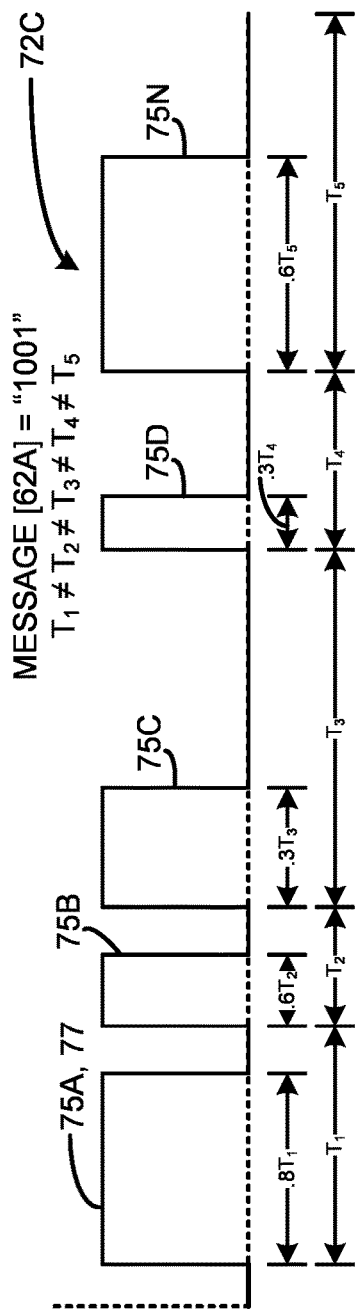
FIG. 11C is yet another example plot illustrating pulses of the same pulse width encoded message transmitted of FIGS. 11A, 11B, but with varying periods, within the exemplary data communications system of FIG. 8 and in accordance with the exemplary coding format of FIG. 10, in accordance with FIGS. 7-10 and the present disclosure.

Lastly, and illustrating further the advantages of the system 60, FIG. 11C illustrates a scenario in which a data rate may be inconsistent, to the point where each period may have a different length. To that end, while visually, the plot of the encoded message 72B indicates something different from the encoded message 72A of FIG. 11A and/or the encoded message 72B of FIG. 11B, the encoded message 72B is identical to the encoded message 72A, as the encoding is independent of data rate. As illustrated, as with FIG. 11A, each pulse has a width that corresponds to the ratio of the duty cycle of each pulse for each encoded word 75 (e.g., start correlated ratio is $0.8T_1$, "1" is $0.6T_2$, "0" is $0.3 T_3$, "0" is $0.3T_4$, and "1" is $0.6T_5$).

Figure 12:
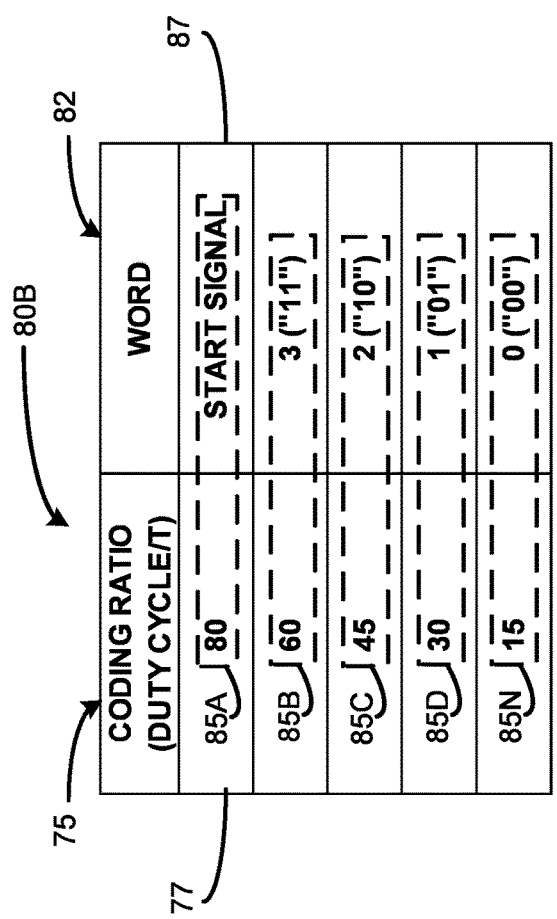
FIG. 12 is another example table illustrating a non-limiting example of data contained in the coding format of FIG. 9, in accordance with FIGS. 7-9 and the present disclosure.
Figure 13:
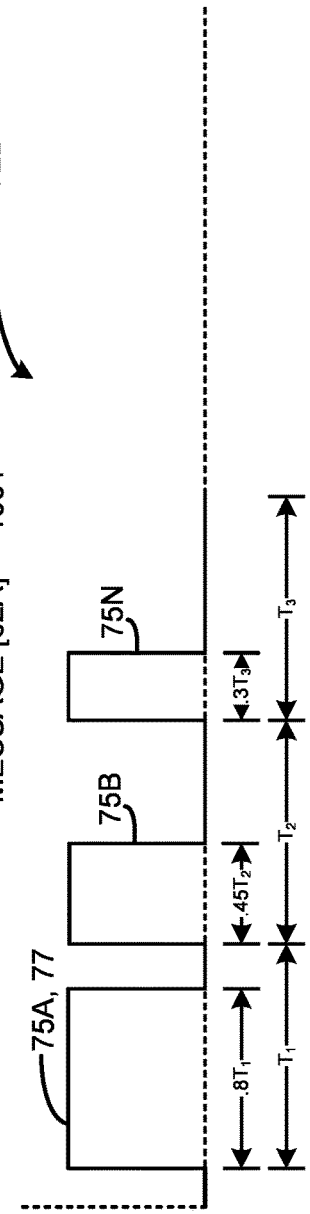
FIG. 13 is an example plot illustrating pulses of a pulse width encoded message transmitted within the exemplary data communications system of FIG. 7 and in accordance with the exemplary coding format of FIG. 12, in accordance with FIGS. 7-10, 12 and the present disclosure.

Turning now to FIGS. 12 and 13, an alternative coding format 80B, which may be utilized to encode the message 62A of "1001," is illustrated. The coding format 80B is illustrated as a two-bit binary coding method, including a format start bit 87 correlating with a start bit 67. As illustrated, the coding format 80B has five correlated ratios 85, which allow for communication of four different format messages 82 and the start bit 87. FIG. 13 illustrates, visually, the encoded message 72D, utilizing the coding format 80B, to encode the same message 62A. While appearing, visually, as a different message than those of encoded messages 72A, 72B, and/or 72C, the encoded message 72D includes the same data as the encoded messages 72A, 72B, 72C. In fact, the encoded message 72D illustrates yet another advantage of the data communications system 60, as the encoded message 72D is a compressed version of any of the encoded messages 72A, 72B, 72C, as it includes only three pulses, versus five. By utilizing the pulse width encoding of the system 60, data compression of the message 62 is only limited by system hardware and/or software granularity (e.g., in terms of edge detection of a pulse width modulated signal).

Figure 14:
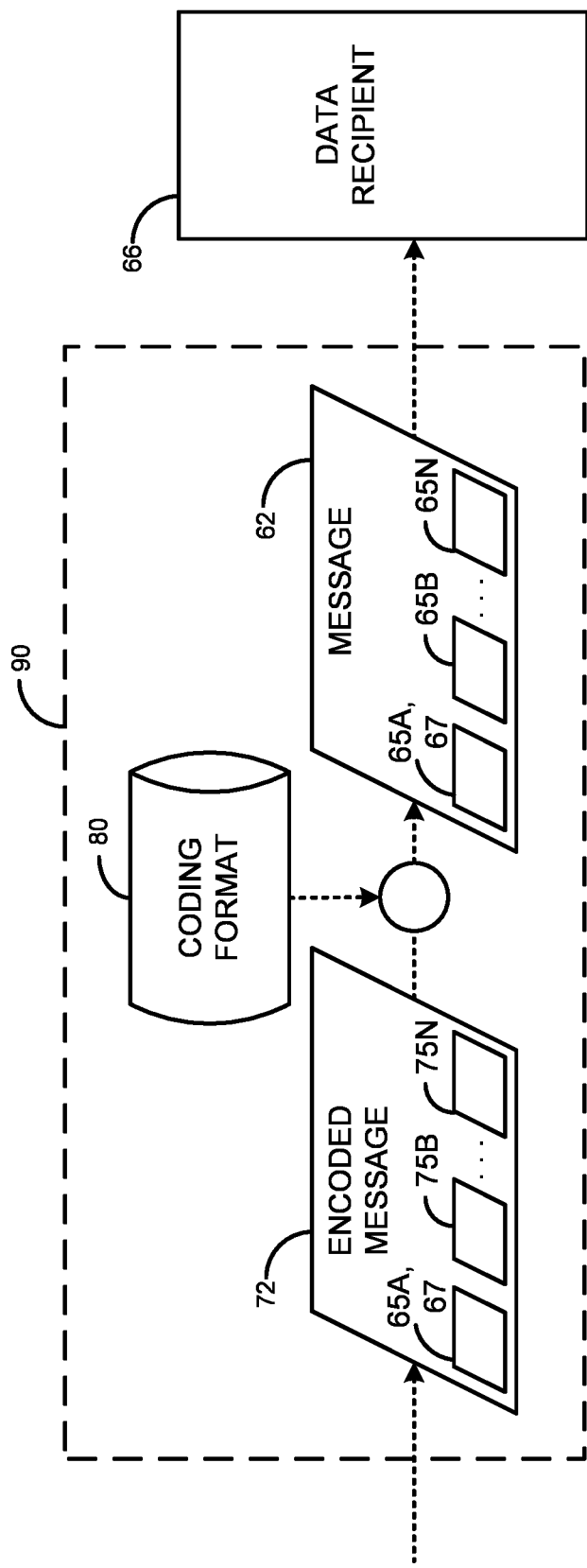
FIG. 14 is a block diagram illustrating components and/or data associated with the decoder of the exemplary data communications system of FIG. 7, in accordance with FIG. 7 and the present disclosure.

Turning now to FIG. 14, the decoder 90 is illustrated in greater detail. The decoder 90 is configured to receive the encoded message 72, as one or more message words 75, and reference the detected encoded message words 72 versus the coding format 80. The decoder 90 references each of the encoded message words 75 against the plurality of correlated ratios 85, determines correlated format words 82, and outputs the correlated format words 82 as the output message words 65, to compile the message 62. The message 62 is then output to the data recipient 66, as the message 62. By utilizing the coding format 80, the only requirements for hardware and/or software at the decoder 90, for detecting high and/or low edges of pulses, to decode the encoded message 67 are knowledge of the correlated pairs of correlated ratios 85 and format words 82.

Figure 15:
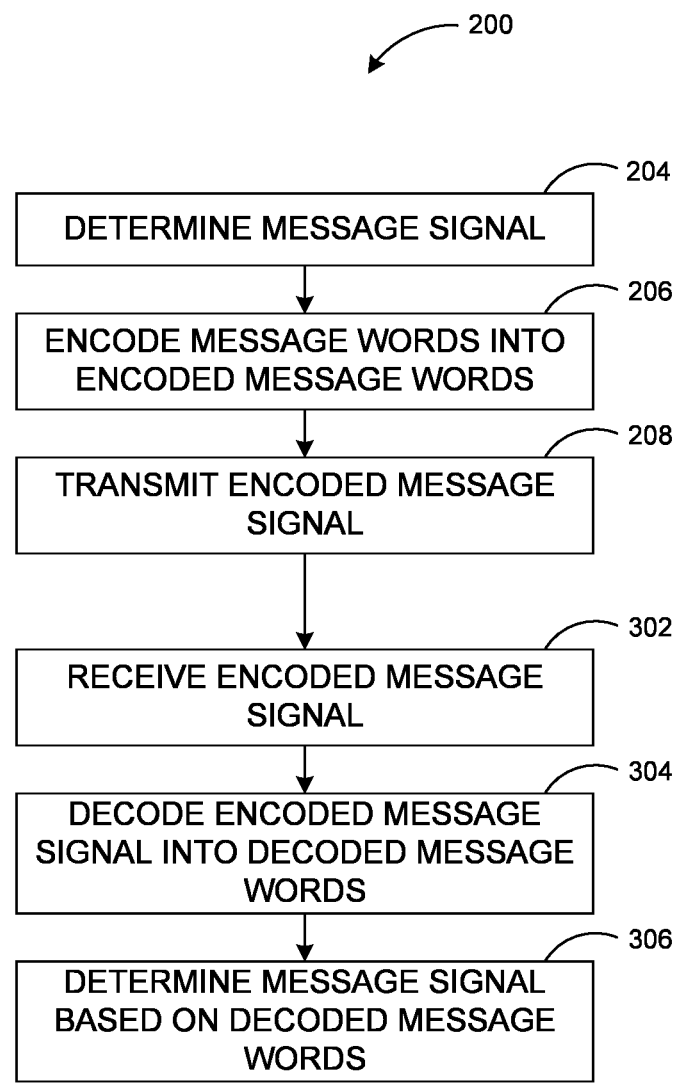
FIG. 15 is an example block diagram illustrating a method for data communications utilizing the system of FIGS. 7-9, 14, and the present disclosure.

FIG. 15 illustrates an exemplary method 200 for performing data communications utilizing the system 60. The method begins, at block 204, by determining the message signal 62 from the data input source 61. The method further includes encoding the message words 65 into encoded message words 75, at the encoder 70, and utilizing the coding format 80. The method further includes transmitting the encoded message signal 75, including the encoded message words 72, over the transfer medium 64. Then, the encoded message signal 72 is received by the decoder 90, as illustrated in block 302. The decoder 90 then decodes the encoded message signal 72 into a plurality of message words 65, by utilizing the coding format 80 to reference the encoded message words 75 against the correlated ratios 85 to determine format words 82, representative of the message words 65.

Figure 16:
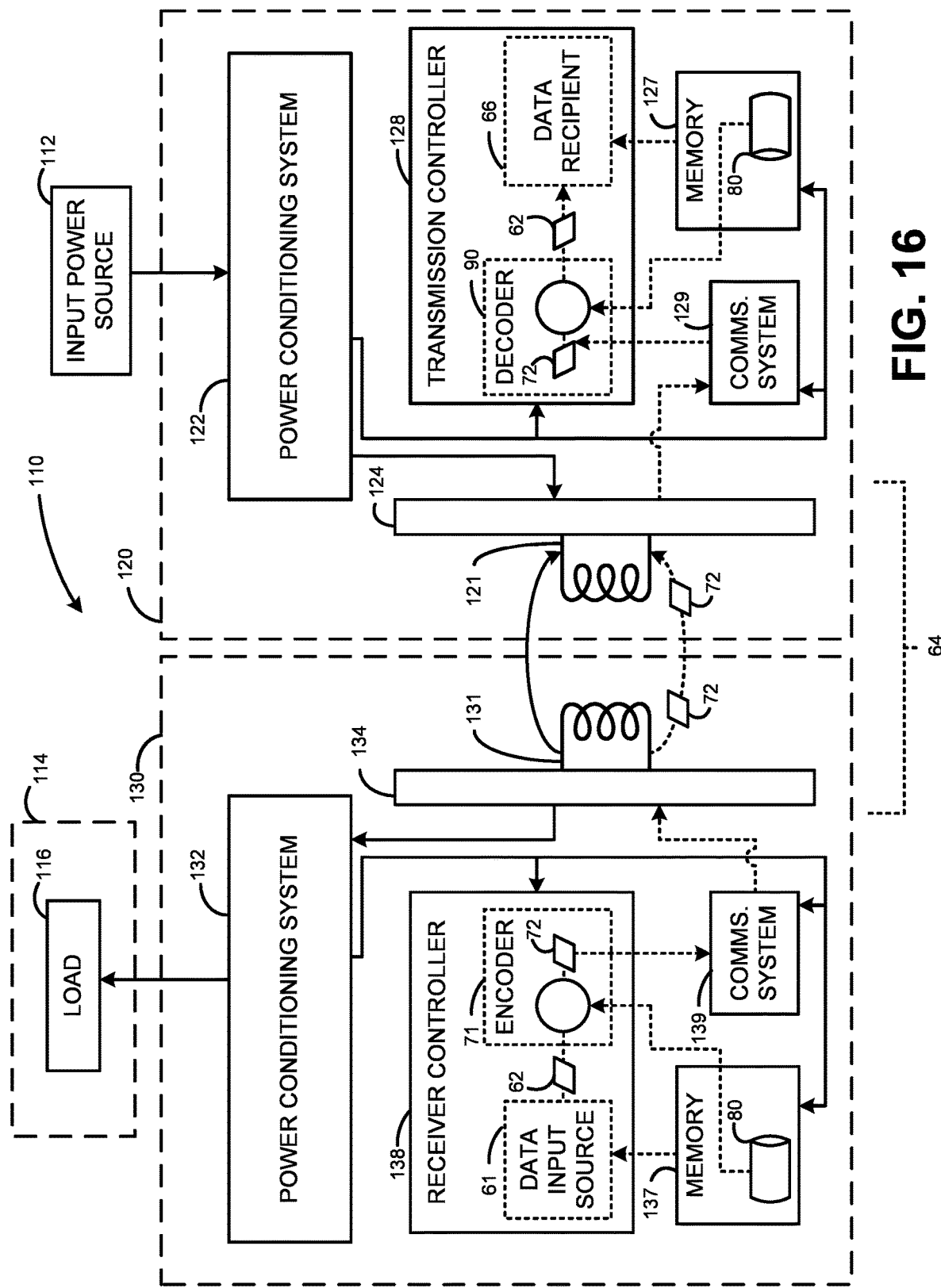
FIG. 16 is an example block diagram for a wireless power transfer system, having like elements to those of the system of FIGS. 1-6, which utilizes the data communications system of FIGS. 7-9 and 14, in accordance with FIGS. 1-9, 14, and the present disclosure.

Turning now to FIG. 16, and with continued reference to FIGS. 1-15, a wireless connector system 110, for wireless power transfer and wireless data transmission, is illustrated. As indicated by the reference numbers, the system 110 may include substantially similar, identical, and/or analogous elements to those of FIGS. 1-6, as indicated by common reference numbers. Alternatively, functionally comparable components, which perform one or more similar functions to another, earlier described component, but have distinguishing characteristics, are denoted by three-digit numbers, wherein the most significant digit indicates a "series" for the current embodiment and the two least significant digits correspond to the earlier described component. "Functionally corresponds," as defined herein, means that the two or more components perform a similar function within the context of their respective, broader system, method, or apparatus. For example, in describing the 110, the most significant digit "1" indicates the series for the embodiment of FIG. 16 and the two least significant digits, "10," indicate that the system functionally corresponds to the earlier described system 10. The system 10 functionally corresponds with the wireless receiver system because both of the systems 10, 110 are configured for transmission electrical energy and/or transmission of electrical data.

A wireless transmission system 120 receives electrical power from an input power source 112 that is in electrical connection with a power conditioning system 122, of which analogous systems are discussed in greater deal, above, with respect to FIG. 5. The input power is then provided to one or more of a transmission controller 128, a communications system 129, a memory 127, and/or any combinations thereof, each of which have analogous systems and/or components described in greater detail, above, with respect to FIGS. 3 and 4. The transmission controller 128 may embody, execute, and/or include the decoder 90 and/or the data recipient 66. A portion of the power output of the power conditioning system 122 is then provided to the transmission antenna 121, via the transmission tuning system 124, all of which have analogous systems and/or components described in greater detail, above, with respect to FIGS. 1-6. The transmission system 120 then may transmit the electrical power to a wireless receiver system 130, via a receiver antenna 131, when the transmission antenna 121 and the receiver antenna 131 are operatively coupled at an operating frequency of the system 110.

The wireless receiver system 130 receives the electrical power via the operative coupling of the receiver antenna 131 and the transmission antenna 121 and provides the electrical power to the power conditioning system 132, via the receiver tuning system 134, all of which have analogous components discussed above with reference to FIG. 5. The power conditioning system 133, as discussed above with reference to FIG. 5, may include, at least, a rectifier for converting an input AC power signal to a DC signal, for power distribution to a load 116 and/or any components of the receiver system 130, such as, but not limited to, a receiver controller, a memory 137, and a communications system 139, all of which have analogous components discussed above with reference to FIG. 5.

The receiver controller 138 may embody, execute, and/or include the encoder 70 and/or the data recipient 66. To that end, the receiver controller 138 may receive and/or generate the message 62, which it then utilizes the encoder 70 to perform pulse-width encoding for encoding the message for transmission to the transmission system 120 and/or the transmission controller 129. Therefore, the receiver controller 138 may also have stored thereon the coding format 80 and/or the coding format may be stored on the memory 127 and recalled by the receiver controller 138. The receiver controller 138 may be utilized to modulate the electromagnetic field coupling the antennas 121, 131, to transmit the encoded message in the frequency band of the wireless power transmission between the systems 120, 130. Additionally or alternatively, the receiver controller 138 may utilize one or more of amplitude shift keying (ASK), phase shift keying (PSK), and/or frequency shift keying (FSK), among other in-band communications methods, to transmit the encoded message 72 about the electromagnetic connection of the antennas 121, 131.

Further, the input data source 61 may include electrical characteristic information associated with the wireless receiver system 130. For example, as the power conditioning system 132 may include or be a rectifier, as discussed above, the data input source 61 may include an output voltage at the output of the rectifier. To that end, the output voltage of the rectifier may then be communicated to the wireless transmission system 120 and, based on the output voltage of the rectifier, the wireless transmission system 120 may raise or lower the amount of power transmitted to the wireless receiver system 130.

Figure 17:
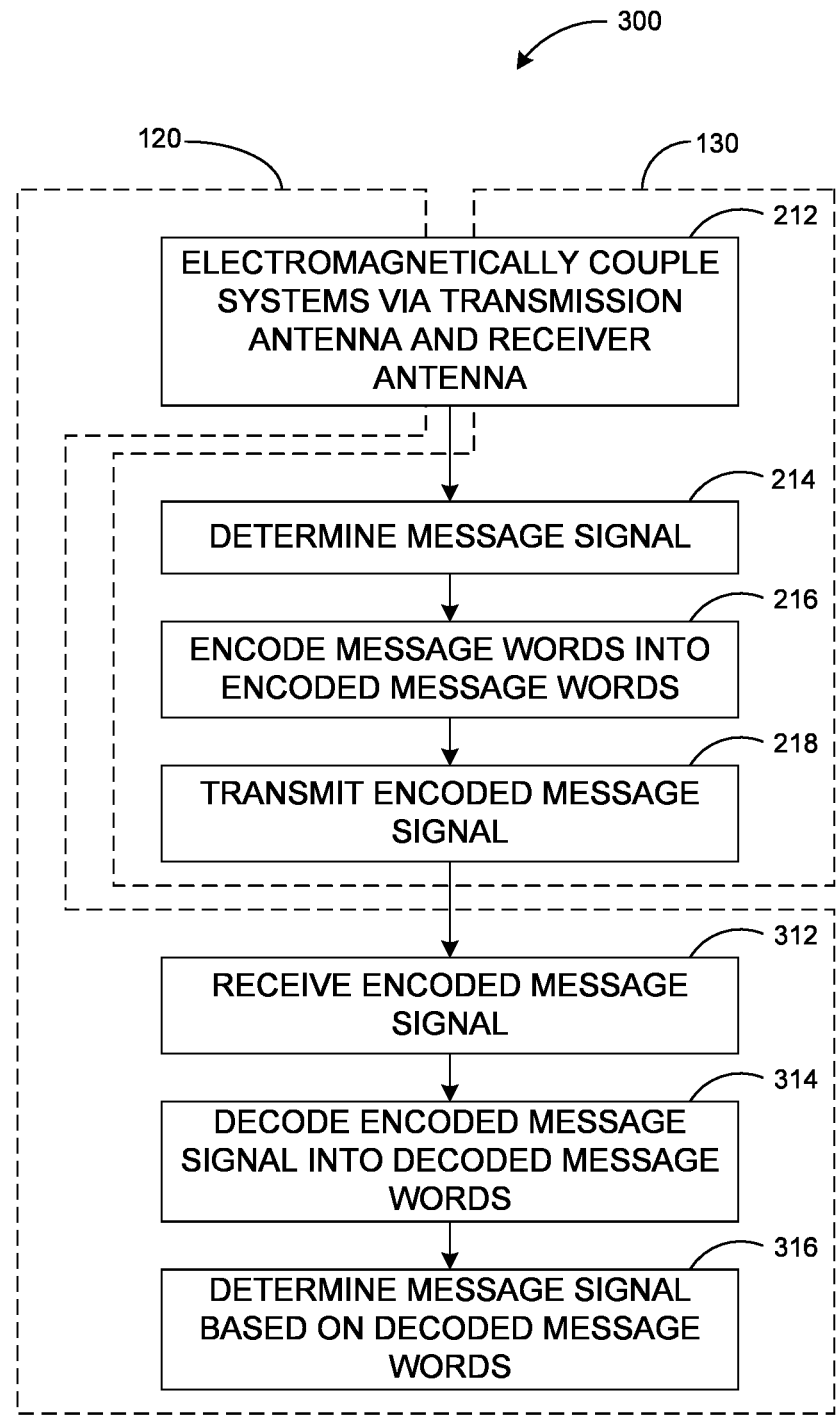
FIG. 17 is an exemplary block diagram for a method for data communications utilizing the data communications system of FIGS. 7-9, and 14, within the operations of the wireless power transfer system of FIG. 16, in accordance with FIGS. 1-9, 14, and the present disclosure.

FIG. 17 is a block diagram for a method 300 for performing data communications utilizing the system 110 and the system 60. The method begins, at block 212, wherein the antennas 121, 131 of the system electromagnetically couple, such that transfer of electrical energy and/or electrical data signals is possible. Then, the receiver controller 138, of the receiver system 130, determines the message signal 62 from the data input source 61, as illustrated at block 214. The method further includes encoding the message words 65 into encoded message words 75, at the encoder 70, and utilizing the coding format 80, as performed at the receiver system 120, at block 216. The method further includes transmitting the encoded message signal 75, including the encoded message words 72, to the wireless transmission system 120, by the wireless receiver system 130, as illustrated at block 218. Then, the encoded message signal 72 is received by the decoder 90, at the transmission controller 129 of the wireless transmission system 120, as illustrated in block 312. The decoder 90 then decodes the encoded message signal 72 into a plurality of message words 65, by utilizing the coding format 80 to reference the encoded message words 75 against the correlated ratios 85 to determine format words 82, representative of the message words 65, as illustrated at block 314. The message signal 62 is then received by the wireless transmission system 120, when it is determined based on decoded message words at the decoder 90, as illustrated in block 316.

Turning now to FIG. 17, an exemplary, non-limiting embodiment of one or more of the transmission antenna 21, the transmission antenna(s) 121, and the receiver antenna 31 that may be used with any of the systems, methods, and/or apparatus disclosed herein. In the illustrated embodiment, the antenna 21, 31, 121, is a flat spiral coil configuration. In the exemplary embodiment shown, the antenna comprises four layers of alternating of an electrical conductor and electrically insulating layers integrated into a printed circuit board (PCB), flexible circuit board (FPC), or a hybrid circuit board (HCB), the HBC comprising a PCB portion and an FPC portion. As shown, the antenna 21, 31, 121 comprises two antenna segments that are electrically connected in series. As shown, the antenna 21, 31, 121 is constructed having five turns of a copper trace 95 deposited on the surface of an insulative substrate 99 with a gap 97 of, for example, 15 to 200 microns between each turn of the trace 95. Each segment comprises an electrical conductor (e.g., trace 95) positioned on an insulative substrate 98 in an electrical parallel configuration. Non-limiting examples can be found in U.S. Pat. Nos. 9,941,743, 9,960,628, 9,941,743 all to Peralta et al., U.S. Pat. Nos. 9,948,129, 10,063,100 to Singh et al., U.S. Pat. No. 9,941,590 to Luzinski, U.S. Pat. No. 9,960,629 to Rajagopalan et al. and U.S. Patent App. Nos. 2017/0040107, 2017/0040105, 2017/0040688 to Peralta et al., all of which are assigned to the assignee of the present application and incorporated fully herein by reference.

In addition, the antenna 21, 31, 121 may be constructed having a multi-layer-multi-turn (MLMT) construction in which at least one insulator is positioned between a plurality of conductors. Non-limiting examples of antennas having an MLMT construction that may be incorporated within the wireless transmission system(s) 20 and/or the wireless receiver system(s) 30 may be found in U.S. Pat. Nos. 8,610,530, 8,653,927, 8,680,960, 8,692,641, 8,692,642, 8,698,590, 8,698,591, 8,707,546, 8,710,948, 8,803,649, 8,823,481, 8,823,482, 8,855,786, 8,898,885, 9,208,942, 9,232,893, 9,300,046, all to Singh et al., assigned to the assignee of the present application are incorporated fully herein. It is also noted that other antennas such as, but not limited to, an antenna configured to send and receive signals in the UHF radio wave frequency such IEEE standard 802.15.1 may be incorporated within the systems, methods, and/or apparatus of the present invention.

Figure 18:
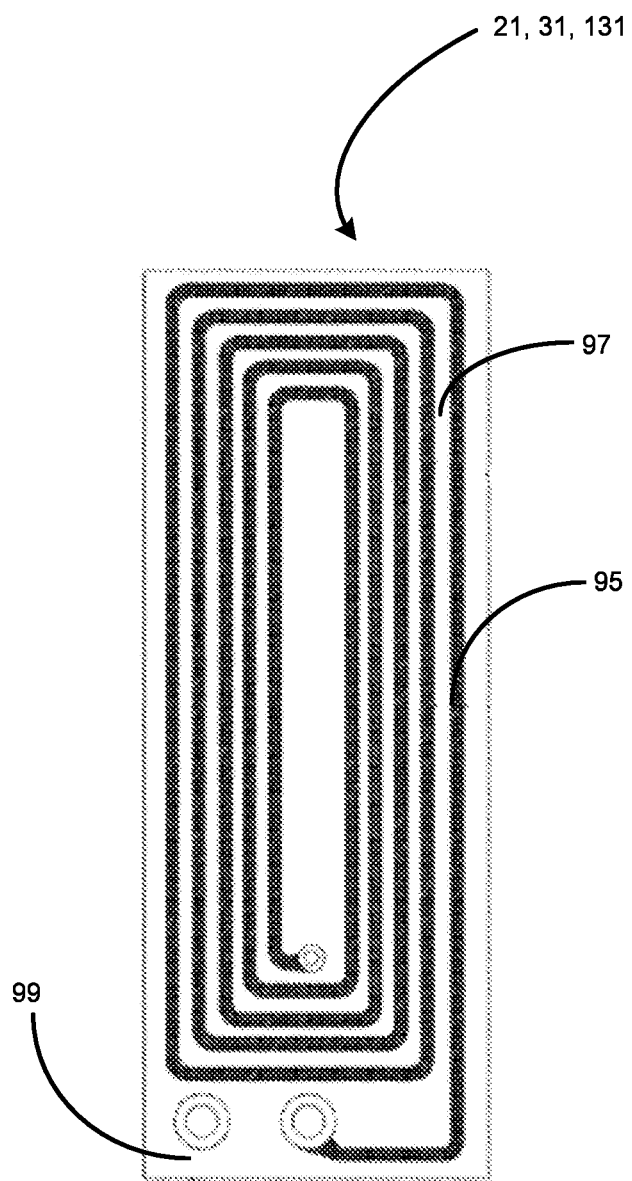
FIG. 18 is a top view of an exemplary antenna, for use as one or both of a transmission antenna and a receiver antenna of the system of FIGS. 1, 16 and/or any other systems, methods, or apparatus disclosed herein, in accordance with the present disclosure.

FIG. 18 is an example block diagram for a method 1000 for designing a system for wirelessly transferring one or more of electrical energy, electrical power, electromagnetic energy, and electronic data, in accordance with the systems, methods, and apparatus of the present disclosure. To that end, the method 1000 may be utilized to design a system in accordance with any disclosed embodiments of the systems 10, 110 and any components thereof.

At block 1200, the method 1000 includes designing a wireless transmission system for use in the system 10, 110. The wireless transmission system designed at block 1200 may be designed in accordance with one or more of the aforementioned and disclosed embodiments of the wireless transmission systems 20, 120, and 120A-H, in whole or in part and, optionally, including any components thereof. Block 1200 may be implemented as a method 1200 for designing a wireless transmission system.

Turning now to FIG. 19 and with continued reference to the method 1000 of FIG. 18, an example block diagram for the method 1200 for designing a wireless transmission system is illustrated. The wireless transmission system designed by the method 1000 may be designed in accordance with one or more of the aforementioned and disclosed embodiments of the wireless transmission systems 20, 120, and 120A-H in whole or in part and, optionally, including any components thereof. The method 1200 includes designing and/or selecting a transmission antenna for the wireless transmission system, as illustrated in block 1210. The designed and/or selected transmission antenna may be designed and/or selected in accordance with one or more of the aforementioned and disclosed embodiments of the transmission antenna 21, 121, 121A-N, in whole or in part and including any components thereof. The method 1200 includes designing and/or tuning a transmission tuning system for the wireless transmission system, as illustrated in block 1220. Such designing and/or tuning may be utilized for, but not limited to being utilized for, impedance matching, as discussed in more detail above. The designed and/or tuned transmission tuning system may be designed and/or tuned in accordance with one or more of the aforementioned and disclosed embodiments of wireless transmission systems 20, 120, and 120A-H in whole or in part and, optionally, including any components thereof.

The method 1200 further includes designing a power conditioning system for the wireless transmission system, as illustrated in block 1230. The power conditioning system designed may be designed with any of a plurality of power output characteristic considerations, such as, but not limited to, power transfer efficiency, maximizing a transmission gap (e.g., the gap 17), increasing output voltage to a receiver, mitigating power losses during wireless power transfer, increasing power output without degrading fidelity for data communications, optimizing power output for multiple coils receiving power from a common circuit and/or amplifier, among other contemplated power output characteristic considerations. The power conditioning system may be designed in accordance with one or more of the aforementioned and disclosed embodiments of the power conditioning system 40, in whole or in part and, optionally, including any components thereof. Further, at block 1240, the method 1200 may determine and optimize a connection, and any associated connection components, to configure and/or optimize a connection between the input power source 12 and the power conditioning system of block 1230. Such determining, configuring, and/or optimizing may include selecting and implementing protection mechanisms and/or apparatus, selecting and/or implementing voltage protection mechanisms, among other things.

The method 1200 further includes designing and/or programing a transmission control system of the wireless transmission system of the method 1000, as illustrated in block 1250. The designed transmission control system may be designed in accordance with one or more of the aforementioned and disclosed embodiments of the transmission control system 26, in whole or in part and, optionally, including any components thereof. Such components thereof include, but are not limited to including, the sensing system 50, the driver 41, the transmission controller 28, the memory 27, the communications system 29, the thermal sensing system 52, the object sensing system 54, the receiver sensing system 56, the other sensor(s) 58, the gate voltage regulator 43, the PWM generator 41, the frequency generator 348, in whole or in part and, optionally, including any components thereof.

Returning now to FIG. 18, at block 1300, the method 1000 includes designing a wireless receiver system for use in the system 10. The wireless transmission system designed at block 1300 may be designed in accordance with one or more of the aforementioned and disclosed embodiments of the wireless receiver system 30 in whole or in part and, optionally, including any components thereof. Block 1300 may be implemented as a method 1300 for designing a wireless receiver system.

Turning now to FIG. 20 and with continued reference to the method 1000 of FIG. 8, an example block diagram for the method 1300 for designing a wireless receiver system is illustrated. The wireless receiver system designed by the method 1300 may be designed in accordance with one or more of the aforementioned and disclosed embodiments of the wireless receiver system 30 in whole or in part and, optionally, including any components thereof. The method 1300 includes designing and/or selecting a receiver antenna for the wireless receiver system, as illustrated in block 1310. The designed and/or selected receiver antenna may be designed and/or selected in accordance with one or more of the aforementioned and disclosed embodiments of the receiver antenna 31, in whole or in part and including any components thereof. The method 1300 includes designing and/or tuning a receiver tuning system for the wireless receiver system, as illustrated in block 1320. Such designing and/or tuning may be utilized for, but not limited to being utilized for, impedance matching, as discussed in more detail above. The designed and/or tuned receiver tuning system may be designed and/or tuned in accordance with one or more of the aforementioned and disclosed embodiments of the receiver tuning system 34 in whole or in part and/or, optionally, including any components thereof.

The method 1300 further includes designing a power conditioning system for the wireless receiver system, as illustrated in block 1330. The power conditioning system designed may be designed with any of a plurality of power output characteristic considerations, such as, but not limited to, power transfer efficiency, maximizing a transmission gap (e.g., the gap 17), increasing output voltage to a receiver, mitigating power losses during wireless power transfer, increasing power output without degrading fidelity for data communications, optimizing power output for multiple coils receiving power from a common circuit and/or amplifier, among other contemplated power output characteristic considerations. The power conditioning system may be designed in accordance with one or more of the aforementioned and disclosed embodiments of the power conditioning system 32 in whole or in part and, optionally, including any components thereof. Further, at block 1340, the method 1300 may determine and optimize a connection, and any associated connection components, to configure and/or optimize a connection between the load 16 and the power conditioning system of block 1330. Such determining, configuring, and/or optimizing may include selecting and implementing protection mechanisms and/or apparatus, selecting and/or implementing voltage protection mechanisms, among other things.

The method 1300 further includes designing and/or programing a receiver control system of the wireless receiver system of the method 1300, as illustrated in block 1350. The designed receiver control system may be designed in accordance with one or more of the aforementioned and disclosed embodiments of the receiver control system 36 in whole or in part and, optionally, including any components thereof. Such components thereof include, but are not limited to including, the receiver controller 38, the memory 37, and the communications system 39, in whole or in part and, optionally, including any components thereof.

Returning now to the method 1000 of FIG. 18, the method 1000 further includes, at block 1400, optimizing and/or tuning both the wireless transmission system and the wireless receiver system for wireless power transfer. Such optimizing and/or tuning includes, but is not limited to including, controlling and/or tuning parameters of devices to match impedance, optimize and/or configure voltage and/or power levels of an output power signal, among other things and in accordance with any of the disclosed systems, methods, and apparatus herein. Further, the method 1000 includes optimizing and/or tuning both the wireless transmission system and the wireless receiver system for data communications, in view of system characteristics necessary for wireless power transfer. Such optimizing and/or tuning includes, but is not limited to including, optimizing power characteristics for concurrent transmission of electrical energy and electrical data signals, tuning quality factors of antennas for different transmission schemes, among other things and in accordance with any of the disclosed systems, methods, and apparatus herein.

FIG. 21 is an example block diagram for a method 2000 for manufacturing a system for wirelessly transferring one or both of electrical energy and electronic data, in accordance with the systems, methods, and apparatus of the present disclosure. To that end, the method 2000 may be utilized to manufacture a system in accordance with any disclosed embodiments of the systems 10, 110 and any components thereof.

At block 2200, the method 2000 includes manufacturing a wireless transmission system for use in the system 10. The wireless transmission system manufactured at block 2200 may be designed in accordance with one or more of the aforementioned and disclosed embodiments of the wireless transmission systems 20, 120 and/or 120A-H in whole or in part and, optionally, including any components thereof. Block 2200 may be implemented as a method 2200 for manufacturing a wireless transmission system.

Turning now to FIG. 22 and with continued reference to the method 2000 of FIG. 21, an example block diagram for the method 2200 for manufacturing a wireless transmission system is illustrated. The wireless transmission system manufactured by the method 2000 may be manufactured in accordance with one or more of the aforementioned and disclosed embodiments of the wireless transmission systems 20, 120, and 120A-H in whole or in part and, optionally, including any components thereof. The method 2200 includes manufacturing a transmission antenna for the wireless transmission system, as illustrated in block 2210. The manufactured transmission system may be built and/or tuned in accordance with one or more of the aforementioned and disclosed embodiments of the transmission antenna 21, 121, and 121A-N, in whole or in part and including any components thereof. The method 2200 includes building and/or tuning a transmission tuning system for the wireless transmission system, as illustrated in block 2220. Such designing and/or tuning may be utilized for, but not limited to being utilized for, impedance matching, as discussed in more detail above. The built and/or tuned transmission tuning system may be designed and/or tuned in accordance with one or more of the aforementioned and disclosed embodiments of the transmission tuning system 24, in whole or in part and, optionally, including any components thereof.

The method 2200 further includes selecting and/or connecting a power conditioning system for the wireless transmission system, as illustrated in block 2230. The power conditioning system manufactured may be designed with any of a plurality of power output characteristic considerations, such as, but not limited to, power transfer efficiency, maximizing a transmission gap (e.g., the gap 17), increasing output voltage to a receiver, mitigating power losses during wireless power transfer, increasing power output without degrading fidelity for data communications, optimizing power output for multiple coils receiving power from a common circuit and/or amplifier, among other contemplated power output characteristic considerations. The power conditioning system may be designed in accordance with one or more of the aforementioned and disclosed embodiments of the power conditioning system 40 in whole or in part and, optionally, including any components thereof Further, at block 2240, the method 2200 may determine and optimize a connection, and any associated connection components, to configure and/or optimize a connection between the input power source 12 and the power conditioning system of block 2230. Such determining, configuring, and/or optimizing may include selecting and implementing protection mechanisms and/or apparatus, selecting and/or implementing voltage protection mechanisms, among other things.

The method 2200 further includes assembling and/or programing a transmission control system of the wireless transmission system of the method 2000, as illustrated in block 2250. The assembled transmission control system may be designed in accordance with one or more of the aforementioned and disclosed embodiments of the transmission control system 26 in whole or in part and, optionally, including any components thereof. Such components thereof include, but are not limited to including, the sensing system 50, the driver 41, the transmission controller 28, the memory 27, the communications system 29, the thermal sensing system 52, the object sensing system 54, the receiver sensing system 56, the other sensor(s) 58, the gate voltage regulator 43, the PWM generator 41, the frequency generator 348, in whole or in part and, optionally, including any components thereof.

Returning now to FIG. 21, at block 2300, the method 2000 includes manufacturing a wireless receiver system for use in the system 10. The wireless transmission system manufactured at block 2300 may be designed in accordance with one or more of the aforementioned and disclosed embodiments of the wireless receiver system 30 in whole or in part and, optionally, including any components thereof. Block 2300 may be implemented as a method 2300 for manufacturing a wireless receiver system.

Turning now to FIG. 23 and with continued reference to the method 2000 of FIG. 21, an example block diagram for the method 2300 for manufacturing a wireless receiver system is illustrated. The wireless receiver system manufactured by the method 2000 may be designed in accordance with one or more of the aforementioned and disclosed embodiments of the wireless receiver system 30 in whole or in part and, optionally, including any components thereof. The method 2300 includes manufacturing a receiver antenna for the wireless receiver system, as illustrated in block 2310. The manufactured receiver antenna may be manufactured, designed, and/or selected in accordance with one or more of the aforementioned and disclosed embodiments of the receiver antenna 31 in whole or in part and including any components thereof. The method 2300 includes building and/or tuning a receiver tuning system for the wireless receiver system, as illustrated in block 2320. Such building and/or tuning may be utilized for, but not limited to being utilized for, impedance matching, as discussed in more detail above. The built and/or tuned receiver tuning system may be designed and/or tuned in accordance with one or more of the aforementioned and disclosed embodiments of the receiver tuning system 34 in whole or in part and, optionally, including any components thereof.

The method 2300 further includes selecting and/or connecting a power conditioning system for the wireless receiver system, as illustrated in block 2330. The power conditioning system designed may be designed with any of a plurality of power output characteristic considerations, such as, but not limited to, power transfer efficiency, maximizing a transmission gap (e.g., the gap 17), increasing output voltage to a receiver, mitigating power losses during wireless power transfer, increasing power output without degrading fidelity for data communications, optimizing power output for multiple coils receiving power from a common circuit and/or amplifier, among other contemplated power output characteristic considerations. The power conditioning system may be designed in accordance with one or more of the aforementioned and disclosed embodiments of the power conditioning system 32 in whole or in part and, optionally, including any components thereof. Further, at block 2340, the method 2300 may determine and optimize a connection, and any associated connection components, to configure and/or optimize a connection between the load 16 and the power conditioning system of block 2330. Such determining, configuring, and/or optimizing may include selecting and implementing protection mechanisms and/or apparatus, selecting and/or implementing voltage protection mechanisms, among other things.

The method 2300 further includes assembling and/or programing a receiver control system of the wireless receiver system of the method 2300, as illustrated in block 2350. The assembled receiver control system may be designed in accordance with one or more of the aforementioned and disclosed embodiments of the receiver control system 36 in whole or in part and, optionally, including any components thereof. Such components thereof include, but are not limited to including, the receiver controller 38, the memory 37, and the communications system 39, in whole or in part and, optionally, including any components thereof.

Returning now to the method 2000 of FIG. 21, the method 2000 further includes, at block 2400, optimizing and/or tuning both the wireless transmission system and the wireless receiver system for wireless power transfer. Such optimizing and/or tuning includes, but is not limited to including, controlling and/or tuning parameters of devices to match impedance, optimize and/or configure voltage and/or power levels of an output power signal, among other things and in accordance with any of the disclosed systems, methods, and apparatus herein. Further, the method 2000 includes optimizing and/or tuning both the wireless transmission system and the wireless receiver system for data communications, in view of system characteristics necessary for wireless power transfer, as illustrated at block 2500. Such optimizing and/or tuning includes, but is not limited to including, optimizing power characteristics for concurrent transmission of electrical energy and electrical data signals, tuning quality factors of antennas for different transmission schemes, among other things and in accordance with any of the disclosed systems, methods, and apparatus herein.

The systems, methods, and apparatus disclosed herein are designed to operate in an efficient, stable and reliable manner to satisfy a variety of operating and environmental conditions. The systems, methods, and/or apparatus disclosed herein are designed to operate in a wide range of thermal and mechanical stress environments so that data and/or electrical energy is transmitted efficiently and with minimal loss. In addition, the system 10 may be designed with a small form factor using a fabrication technology that allows for scalability, and at a cost that is amenable to developers and adopters. In addition, the systems, methods, and apparatus disclosed herein may be designed to operate over a wide range of frequencies to meet the requirements of a wide range of applications.

In an embodiment the system may transmit electrical power on the order of about 100 µW to about 10 W. In another embodiment, electrical power up to around about 500 W may also be transmitted. Specifically considering near field magnetic coupling (NFMC) as the mechanism of wireless power transfer between the wireless transmission systems 20, 120, 120A-H and the wireless receiver systems 30, it is well known that smaller sizes are generally more easily achievable if a higher operating frequency is selected. This is due to the inverse relationship of the required mutual inductance and the frequency of operation, as indicated by the following equation:

$$M = \frac{V_{induced}}{j * \omega * I_{Tx}}$$

where:

$V_{induced}$ is induced voltage on the receiver antenna coil $I_{tx}$ is the AC current flowing through the transmitter antenna coil, and ω is the operating frequency multiplied by 2π.

Since the required mutual inductance increases in order to enable the wireless transfer of electrical energy having increased, it is necessary to increase the inductance or coupling of the transmitter or receiver while minimizing AC losses. Mutual inductance can be calculated by the following relationship:

$$M = k * \sqrt{L_{Tx} * L_{Rx}}, \text{ where:}$$

M is the mutual inductance of the system, k is the coupling of the system, $L_{Tx}$ is the inductance of the transmitter antenna coil, and $L_{Rx}$ is the inductance of the receiver antenna coil.

As the form factor of the antenna coil is reduced, attaining the required inductance on either the receiver or transmitter is accompanied by an increase in antenna coil resistance as the high number of turns required leads to a reduction in trace width. This increase in resistance typically reduces the quality factor of the antenna coil and overall coil to coil efficiency of the system where the Quality factor is defined as:

$$Q = \frac{\omega * L}{R},$$

where:

Q is the quality factor of the antenna coil,

L is the inductance of the antenna coil,

ω is the operating frequency of the antenna coil in radians/second (alternatively, if the frequency of operation is in Hz, the operating frequency is ω divided by 2π), R is the equivalent series resistance (ESR) at the operating frequency.

Further, transmission (Tx) antenna coil to receiver (Rx) antenna coil efficiency (Eff) is defined by the following equation:

$$Eff = \frac{k^2 * Q_{Rx} * Q_{Tx}}{1 + \sqrt{1 + k^2 * Q_{Rx} * Q_{Tx}}},$$

where:

k is the coupling of the system, $Q_{Rx}$ is the quality factor of the receiver antennal, and $Q_{Tx}$ is the quality factor of the transmission antenna.

In an embodiment, a ferrite shield may be incorporated within the antenna structure to improve antenna performance. Selection of the ferrite shield material is dependent on the operating frequency as the complex magnetic permeability ($\mu=\mu'-j*\mu''$) is frequency dependent. The material may be a sintered flexible ferrite sheet, a rigid shield, or a hybrid shield, wherein the hybrid shield comprises a rigid portion and a flexible portion. Additionally, the ferrite shield may be composed of varying material compositions. Examples of materials may include, but are not limited to, zinc comprising ferrite materials such as manganese-zinc, nickel-zinc, copper-zinc, magnesium-zinc, and combinations thereof.

In addition, depending on the operating frequency and power requirements of the system 10, 110, a hybrid antenna construction comprising a Litz wire and a PCB coil combination may be desired to efficiently transfer power. In an embodiment, a hybrid Litz wire and PCB coil combination may comprise the transmission antenna 21, 121, 121A-N or the receiver antenna 31 of a wrapped Litz wire construction and the other of the transmitter antenna 21, 121, 121A-N or the receiver antenna 31 may be constructed having a coil disposed on a surface of a circuit board such as the antenna shown in FIG. 17. Lower operating frequencies on the order of 100 kHz to several MHz range may require a certain mutual inductance between the transmission and receiver antenna 21, 31, 121, 121A-N. This is attainable by using a transmitter antenna 21, 121, 121A-B of a Litz wire construction having a novel ferrite core in combination with a receiver antenna 31 comprising a coil disposed on a surface of a circuit board, such as the antenna shown in FIG. 17.

In order to increase mutual inductance, the coupling and/or inductance of the transmitter module 20, 120, 120A-H or the receiver module 30 must be increased. However, due to the small form factor constraints, coupling is limited by the physical size of the connector modules. It is noted that using transmitter and receiver antennas 21, 31, 121, 121A-N of a construction comprising a coil disposed on the surface of a circuit board, such as the antenna shown in FIG. 17, may increase inductance and increase the resistance of the antenna coils thereby decreasing the quality factor Q and antenna to antenna efficiency.

In an embodiment, the system 10, 110 comprising a transmission system 20, 120, 120A-H having a transmission antenna 21, 121, 121A-N of a Litz-wire construction and a shielding material and a receiver system 30 having a receiver antenna 31 comprising a coil disposed on a surface of a circuit board (FIG. 17) may be used to increase the coupling and mutual inductance of an exemplary small form factor of the system 10, 110. To achieve a higher antenna to antenna efficiency, this configuration may be used to achieve the necessary power transfer while maintaining high Q factor at lower frequencies. These improvements may also increase the overall performance of an exemplary system 10, 110 having a relatively small form factor.

The choice of coil design and construction is determined by a combination of the following electrical and magnetic parameters: inductance (L), equivalent series resistance (ESR) at the operating frequency, coupling (k), and Mutual inductance. For lower operating frequencies, i.e., from about 100 kHz to about 10 MHz, and for achieving increased power transmission on the order of about 0.1 mm to about 100 mm, this particular antenna topology is beneficial. For example, per the mutual inductance equations, if the power to be delivered to a load is constant, while the operating frequency decreases, the mutual inductance between the transmitter and receiver antenna coils increases at a constant transmit current. Table I illustrates the improvement in mutual inductance. Table II illustrates the improvement in coupling and Table III illustrates the improvement in antenna to antenna efficiency.

TABLE I

| Transmitter Antenna Construction | Transmitter Antenna Shield | Receiver Antenna Construction | M (µH) |
|---|---|---|---|
| Coil on FR4 PCB | Sheet | Coil on FR4 PCB | 0.35 |
| Litz Wire | T-Core | Coil on FR4 PCB | 1.35 |

TABLE II

| Transmitter Antenna Construction | Transmitter Antenna Shield | Receiver Antenna Construction | Coupling |
|---|---|---|---|
| Coil on FR4 PCB | Sheet | Coil on FR4 PCB | 0.26 |
| Litz Wire | T-Core | Coil on FR4 PCB | 0.29 |

TABLE III

| Transmitter Antenna Construction | Transmitter Antenna Shield | Receiver Antenna Construction | Antenna to Antenna Efficiency |
|---|---|---|---|
| Coil on FR4 PCB | Sheet | Coil on FR4 PCB | 57.9% |
| Litz Wire | T-Core | Coil on FR4 PCB | 80.8% |

In addition, if the system 10 is operated at a higher frequency, i.e., on the order of about 1 MHz or greater, the required mutual inductance will be reduced, thereby allowing for smaller transmitter and receiver antennas 21, 31, 121, 121A-N, wireless transmission systems 20, 120, 120A-H and wireless receiver systems 30. As defined herein shielding material is a material that captures a magnetic field. An example of which is a ferrite material. In the embodiments detailed in Tables I-III, a sheet of ferrite material is positioned directly adjacent to the transmitter antenna 21, for example, behind the transmission antenna 21, 121, 121A-N. As defined herein a "T-Core" shielding material is a magnetic field shield assembly comprising a sheet of shielding material, such as a ferrite material, placed directly behind the transmitter or receiver antenna 21, 31, 121 and an additional second shielding material, such as a ferrite material, placed within the inside area of a coil in the plane of the transmitter or receiver antenna 21, 31, 121. Furthermore, the wireless transmission system 20 or the wireless receiver system 30 may be constructed having the respective transmitter or receiver antennas 21, 31, 121 comprising a "C-core" shielding material in which the shielding material, such as a ferrite material, configured similarly to the letter "C", is positioned adjacent to the antenna 21, 31, 121. In addition, the wireless transmission system 20 or the wireless receiver system 30 may be constructed having the respective transmitter or receiver antennas 21, 31, 121 comprising a "E-core" shielding material in which the shielding material, such as a ferrite material, configured similarly to the letter "E", is positioned adjacent to the antenna 21, 31, 121.

Utilizing relatively small sized printed circuit board or flexible printed circuit board (PCB/FPC) based coil-antennas allow for appropriate stackups, appropriate trace widths, gap widths and copper (or other conductive material) depths that are more suitable for higher frequencies. Further, printed circuit board and flex printed circuit board-based, coil-antennas are highly integrated into the PCB fabrication process, thereby allowing for integration with the rest of the circuitry. This also allows for the integration of MLMT antenna designs to reduce ESR and improve the Q of the antennas.

Furthermore, utilizing coils in a layered approach allows for other fabrication processes, for example, printing, printing on fabrics, semiconductor fabrication processes, such as a low temperature co-fired ceramic (LTCC) process, a high temperature co-fired ceramic (HTCC) process, and the like.

Small form factor PCB coil designs are suitable at higher operating frequencies due to a lower required inductance while maintaining a low coil ESR to minimize the power dissipated in the transmit and receive coils. Printed circuit board (PCB) coil antennas offer additional benefits from a manufacturing, cost and assembly standpoint compared to wire-wound antenna coil solutions. For applications with a strict requirement for overall assembly thickness, printed circuit board (PCB) coil antennas are preferred due to the reduced thickness possible even with multilayer construction.

The ferrite shield material selected for the coil combination also depends on the operating frequency as the complex magnetic permeability ($\mu=\mu'-j*\mu''$) is frequency dependent. The material may be a sintered flexible ferrite sheet or a rigid shield and be composed of varying material compositions.

It is noted that the construction of the antenna 21, 31, 121 is non-limiting. The antenna that is incorporated within a system may comprise magnetic wires or have a stamped metal construction. Furthermore, the antenna 21, 31, 121 may utilize thick film, thin film or other printing fabrication technologies in its construction.

In an embodiment, incorporation of a transmitter or receiver antenna 21, 31, 121 having a multi-layer-multi-turn (MLMT) construction significantly reduces the equivalent series resistance (ESR) of the respective wireless transmission systems 20 and wireless receiver systems 30 and the wireless connector system 10 of the present invention. The inventors have discovered that incorporation of at least one transmitter and receiver antenna 21, 31, 121 having a multi-layer-multi-turn (MLMT) construction reduces equivalent series resistance (ESR) of the wireless transmission system 20 or wireless receiver system 30 by about 50 percent.

Furthermore, reducing ESR improves the overall system efficiency and reduces heating in the antenna 21, 31, 121 and the system 10 by reducing the ($I^2 \times R$) losses in the coil. Table IV shown below details the measured ESR for two multi-layer-multi-turn (MLMT) antenna designs in comparison to an antenna constructed comprising Litz wire wrapped around an inductor. As shown in Table IV below, the antenna constructed with an MLMT design exhibited a lower inductance, (0.60 µH) and a lower equivalent series resistance (ESR) (0.50Ω) in comparison to the antenna having a traditional wound Litz wire construction. Thus, the transmitter or receiver antenna 21, 31, 121 having a multi-layer-multi-turn (MLMT) construction contributes to the increased electrical performance of increased electrical power transmission and increased module separation distance of the gap 17 of the system 10 of the present invention.

TABLE III

| Antenna Design | Frequency (MHz) | Inductance (µH) | ESR (Ω) |
|---|---|---|---|
| Litz Wire | 2 | 3.80 | 0.97 |
| MLMT | 2 | 0.60 | 0.50 |
| MLMT | 10 | 0.65 | 1.05 |

Exemplary ways of connecting the module to a host device include, but are not limited to, directly soldering or placing the at least one wireless transmission system 20 and wireless receiver systems 30 on a circuit board or a host device. Alternatively, the at least one wireless transmission system 20, 120, 120A-H and wireless receiver systems 30 could be connected to a circuit board or a host device using a wire/cable. Once connected to a host device, the full structure or at least a portion of the structure of the at least one wireless transmission system 20, 120, 120A-H and wireless receiver systems 30 may be encapsulated within an insulative coating.

In another embodiment, the system 10, 110 of the present application could include a module that can operate both as a transmitter and as a receiver, (e.g., a transceiver). In a further embodiment, the system 10, 110 of the present application may comprise a power and data transfer system in addition to a single antenna where the data is modulated into the power frequency.

In another embodiment, the system 10, 110 of the present invention may comprise multiple antennas within each wireless transmission system 20, 120, 120A-H and wireless receiver systems 30. If a multiple antenna system is employed, then the first antenna could be reserved for identification, diagnostics and any uni- or bi-directional data transfer, while the second antenna can be dedicated to power transfer.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more embodiments, a processor configured to monitor and control an operation or a component may also mean the processor being programmed to monitor and control the operation or the processor being operable to monitor and control the operation.

Likewise, a processor configured to execute code can be construed as a processor programmed to execute code or operable to execute code.

A phrase such as "an aspect" does not imply that such aspect is essential to the subject technology or that such aspect applies to all configurations of the subject technology. A disclosure relating to an aspect may apply to all configurations, or one or more configurations. An aspect may provide one or more examples of the disclosure. A phrase such as an "aspect" may refer to one or more aspects and vice versa. A phrase such as an "embodiment" does not imply that such embodiment is essential to the subject technology or that such embodiment applies to all configurations of the subject technology. A disclosure relating to an embodiment may apply to all embodiments, or one or more embodiments. An embodiment may provide one or more examples of the disclosure. A phrase such an "embodiment" may refer to one or more embodiments and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples of the disclosure. A phrase such as a "configuration" may refer to one or more configurations and vice versa.

The word "exemplary" is used herein to mean "serving as an example, instance, or illustration." Any embodiment described herein as "exemplary" or as an "example" is not necessarily to be construed as preferred or advantageous over other embodiments. Furthermore, to the extent that the term "include," "have," or the like is used in the description or the claims, such term is intended to be inclusive in a manner similar to the term "comprise" as "comprise" is interpreted when employed as a transitional word in a claim. Furthermore, to the extent that the term "include," "have," or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

Reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

While this specification contains many specifics, these should not be construed as limitations on the scope of what may be claimed, but rather as descriptions of particular implementations of the subject matter. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub combination or variation of a sub combination.

What is claimed is:

1. A system for wireless communications comprising:
    an antenna, the antenna configured to transmit electrical data signals to a second system, the electrical data signals including an encoded message signal, the encoded message signal comprising one or more encoded message words; and
    a controller, including a processor, the controller configured to:
        determine a message signal, the message signal including one or more message words,
        encode the one or more message words into one or more encoded message words of the encoded message signal based on a coding format,
            the coding format correlating each of a plurality of correlated ratios, respectively, with one of a plurality of format words, each of the plurality of correlated ratios corresponding to one of the plurality of format words,
            wherein each of the plurality of correlated ratios is a ratio of a duty cycle of a pulse to a respective period associated with one or both of the duty cycle and the pulse,
            wherein each of the one or more encoded message words are encoded as one of the plurality of correlated ratios,
        determine the encoded message signal based on the plurality of encoded message words, and
        communicate the encoded message signal to the second system.

2. The system of claim 1, wherein the plurality of format words includes a start word,
    wherein the plurality of correlated ratios includes a start correlated ratio,
    wherein the start correlated ratio corresponds with the start word,
    wherein the encoded message signal includes an encoded start word, the encoded start word indicating a beginning of the encoded message signal, and
    wherein the encoded start word is encoded as the start correlated ratio.

3. The system of claim 1, wherein the respective period is an asynchronous period.

4. The system of claim 1, wherein the message signal is based, at least in part, on an input data source associated with one of the system, the controller, or any combinations thereof.

5. The system of claim 1, wherein the second system includes, at least, a second antenna, the second antenna configured to couple with the antenna, the second antenna and the antenna coupled via an electromagnetic field, and
    wherein the controller is further configured to modulate the electromagnetic field based on the encoded message signal to transmit the encoded message signal.

6. A communications system comprising:
    a first system including:
        a first antenna, the first antenna configured to receive an encoded message signal, and
        a first controller, including a processor; and a second system including:
- a second antenna configured transmit the encoded message signal, the encoded message signal comprising one or more encoded message words, and
- a second controller, including a processor, the second controller configured to
  - determine a message signal, the message signal including one or more message words,
  - encode the one or more message words into one or more encoded message words of the encoded message signal based on a coding format,
    - the coding format correlating each of a plurality of correlated ratios, respectively, with one of a plurality of format words, each of the plurality of correlated ratios corresponding to one of the plurality of format words,
    - wherein each of the plurality of correlated ratios is a ratio of a duty cycle of a pulse to a respective period associated with one or both of the duty cycle and the pulse, and
    - wherein each of the one or more encoded message words are encoded as one of the plurality of correlated ratios,
  - determine the encoded message signal based on the plurality of encoded message words, and
  - communicate the encoded message signal to the first system; and
- wherein the first controller is configured to:
  - receive the encoded message signal, including the one or more encoded message words,
  - decode the one or more encoded message words into one or more decoded message words, based on the coding format, by referencing each of the one or more decoded message words against the plurality of correlated ratios, and
  - determine the message signal based on the one or more decoded message words.

7. The system of claim 6, wherein the plurality of format words includes a start word,
wherein the plurality of correlated ratios includes a start correlated ratio,
wherein the start correlated ratio corresponds with the start word,
wherein the encoded message signal includes an encoded start word, the encoded start word indicating a beginning of the encoded message signal, and
wherein the encoded start word is encoded as the start correlated ratio.

8. The system of claim 6, wherein decoding the one or more encoded message words, by the first controller, further includes, determining a beginning of the decoded one or more message words based on decoding of an encoded start word.

9. The system of claim 6, wherein the respective period is an asynchronous period.

10. The system of claim 6, wherein the message signal is based, at least in part, on an input data source associated with one of the second system, the second controller, or any combinations thereof.

11. A method for operating a communications system, the method comprising:
electromagnetically coupling a first system with a second system, via electromagnetic coupling of a first antenna of the first system and a second antenna of the second system;
determining a message signal, by the first system, the message signal including one or more message words;
encoding, by the first system, the one or more message words into one or more encoded message words of the encoded message signal, based on a coding format, wherein the coding format correlates a plurality of correlated ratios, respectively, with one of a plurality of format words, each of the plurality of correlated ratios corresponding to one of the plurality of format words, wherein each of the plurality of correlated ratios is a ratio of a duty cycle of a pulse to a respective period associated with one or both of the duty cycle and the pulse, and wherein each of the one or more encoded message words are encoded as one of the plurality of correlated ratios; and
transmitting the encoded message signal, by the first system, to the second system, via the electromagnetic coupling of the first antenna and the second antenna.

12. The method of claim 11, further comprising:
receiving, by the second system, the encoded message signal, including the one or more encoded message words,
decoding, by the second system, the one or more encoded message words into one or more decoded message words, based on the coding format, by referencing each of the one or more decoded message words against the plurality of correlated ratios, and
determining the message signal based on the one or more decoded message words.

13. The method of claim 12, further comprising transmitting electrical energy signals, from the first system to the second system, based, at least in part, on the message signal.

14. The method of claim 11, wherein the plurality of format words includes a start word,
wherein the plurality of correlated ratios includes a start correlated ratio,
wherein the start correlated ratio corresponds with the start word,
wherein the encoded message signal includes an encoded start word, the encoded start word indicating a beginning of the encoded message signal, and
wherein the encoded start word is encoded as the start correlated ratio.

* * * * *